United States Patent [19]
Tamai

[11] Patent Number: 6,084,335
[45] Date of Patent: *Jul. 4, 2000

[54] VIBRATION DRIVEN ACTUATOR APPARATUS AND VIBRATION CONTROL METHOD THEREFOR

[75] Inventor: Jun Tamai, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/720,468

[22] Filed: Sep. 30, 1996

Related U.S. Application Data

[63] Continuation of application No. 08/234,951, Apr. 28, 1994, abandoned.

[30] Foreign Application Priority Data

May 10, 1993 [JP] Japan .................................. 5-108485

[51] Int. Cl.[7] .................................................. H01L 41/08
[52] U.S. Cl. .................. 310/316.02; 310/323.12
[58] Field of Search ........................... 310/316, 317, 310/323; 318/116

[56] References Cited

U.S. PATENT DOCUMENTS

| | | | |
|---|---|---|---|
| 4,560,263 | 12/1985 | Katsuma et al. | 354/195.1 |
| 4,692,649 | 9/1987 | Izukawa et al. | 310/316 |
| 4,727,276 | 2/1988 | Izukawa et al. | 310/316 |
| 4,914,337 | 4/1990 | Takagi | 310/316 |
| 4,954,742 | 9/1990 | Izukawa | 310/316 |
| 5,122,700 | 6/1992 | Tamai et al. | 310/323 |
| 5,124,611 | 6/1992 | Tamai et al. | 310/317 |
| 5,136,215 | 8/1992 | Izukawa | 318/116 |
| 5,146,143 | 9/1992 | Furutsu | 318/116 |
| 5,159,223 | 10/1992 | Suganuma | 310/316 |
| 5,159,253 | 10/1992 | Shimizu et al. | 318/606 |
| 5,162,708 | 11/1992 | Naito et al. | 318/116 |
| 5,173,630 | 12/1992 | Tanaka | 310/316 |
| 5,198,732 | 3/1993 | Morimoto | 318/116 |
| 5,198,935 | 3/1993 | Imanari et al. | 310/317 X |
| 5,214,339 | 5/1993 | Naito | 310/316 |
| 5,231,325 | 7/1993 | Tamai et al. | 310/323 |
| 5,258,694 | 11/1993 | Ohnishi et al. | 318/135 |

FOREIGN PATENT DOCUMENTS

| | | |
|---|---|---|
| 4150781 | 5/1992 | Japan . |
| 5-176562 | 7/1993 | Japan . |

*Primary Examiner*—Mark O. Budd
*Attorney, Agent, or Firm*—Fitzpatrick, Cella, Harper & Scinto

[57] ABSTRACT

A vibration driven actuator apparatus includes a vibration member, a contact member, and a control circuit for driving the vibration member so that the contact member move relative to the vibration member. The vibration member is first driven in a first vibration mode in which the two members move relative to each other, and then is driven in a second vibration mode in which the two members are moved relative to each other, so that the vibration actuator apparatus can be started reliably.

52 Claims, 15 Drawing Sheets

VIBRATION DRIVEN ACTUATOR APPARATUS AND VIBRATION CONTROL METHOD THEREFOR

This application is a continuation of application Ser. No. 08/234,951 filed Apr. 28, 1994, now abandoned.

BACKGROUND OF THE INVENTION

1. Field of the Invention

The present invention relates to a vibration driven actuator apparatus and a vibration control method therefor.

2. Description of the Related Art

Vibration-wave driven actuators have strain generating elements (e.g., electro-mechanical energy conversion elements) which cause mechanical strain in response to an applied electric field or magnetic field. These strain generating elements are mounted in an elastic member which functions as a vibration member. The vibration member is vibrated by the strain generating elements, so that a vibration of the vibration member is converted into continuous or intermittent mechanical movements, which can then be output. Such actuators have recently been used in various fields. Conventionally, a piezoelectric/electrostrictive actuator using a piezoelectric element or electrostrictive element as the strain generating element is most widely used. Since a piezoelectric actuator using a piezoelectric element, also called an ultrasonic-wave motor, is capable of forming a continuous rotary type drive source, it has already been utilized in an optical apparatus, such as a camera, as a drive source in place of a conventional rotary electromagnetic drive motor, and the technology for driving and controlling such an ultrasonic-wave motor generally is known.

The drive control technology for ultrasonic-wave actuators generally has been established over the past several years (The description in this specification is concerned with ultrasonic-wave actuators or ultrasonic-wave motors of the type in which mechanical resonance, which occurs in the vibration member when an alternating electric field or magnetic field is applied to the strain generating element, is made into an output displacement). However, drive control technology for controlling a start-up operation of the actuator and a transient drive state need to be further improved.

In conventional ultrasonic-wave motors installed in an optical apparatus such as a camera, it is well known that, since a moving member serving as a rotor is strongly pressed against a vibration member (stator) by means of a spring, when a stationary moving member is initially started, a force larger than the sum of the stationary friction force between the vibration member and the moving member and the stationary inertial force of the moving member must be applied to the moving member. Therefore, in the conventional drive control technology, control is effected in such a way that a voltage greater than an alternating voltage applied to the piezoelectric element during a normal operation is applied to the element at the start time. However, since such a motor is not always reliably started by this conventional control method, an alternative drive control technology has been proposed, for example, in U.S. Pat. No. 4,560,263, in which standing wave vibrations are generated in the vibration member before starting so that the sticking force between the vibration member and the moving member is weakened before the motor is started (the moving member does not move because traveling waves are not generated).

However, according to an experiment conducted by the inventors of the present invention regarding the ultrasonic-wave motor, it has been found that, although in the drive control technology disclosed in the above publication the transition time from the stationary state to the normal operating state (the state in which traveling wave vibration is generated in the vibration member) can be shortened, reliable starting of the motor is not easily accomplished even at a low voltage. When the inventors of the present invention conducted various experiments as to the cause of this drawback, it was found that when the motor could be started, a close-contact phenomenon occurs between the vibration member and the moving member.

Conventionally, it is known that when an experiment regarding the motor is being carried out by varying the magnitude of the voltage applied to the ultrasonic-wave motor (the voltage is proportional to the size of the amplitude of the vibration member), there is a hysteresis between the voltage necessary at start time and the voltage when the moving member is stopped. When the inventors of the present invention examined the cause of this phenomenon, they discovered that it was caused by a contact force generated between the vibration member and the moving member as described above.

This phenomenon occurs when two objects having surfaces finished with a very high degree of precision are brought into contact with each other. If a slight amount of liquid such as condensed water is present on the surface where the two objects contact each other, then they are brought into close contact by a strong force due to the surface tension of the liquid. Since the surface where the rotor of the ultrasonic-wave motor contacts the stator thereof is machined to an extremely high level of surface precision by mirror finishing, and further since the rotor and the stator are brought into pressure-contact with each other by a spring, when a small number of water droplets is present between the surfaces of the two elements due to a temperature change, such a contact force is likely to occur. Water vapor present in a narrow clearance tends to condense as water. When such a contact force occurs, it becomes impossible to easily release the stator from contact with the rotor even if standing wave vibrations are generated in the stator at the start time.

This contact phenomenon may also occur suddenly when the number of rotations with respect to the moving member decreases sharply. Therefore, there is a risk that the motor will be suddenly stopped in a speed decreasing stage.

To start the moving member by overcoming a contact force when the contact force occurs between the vibration member and the moving member of the motor, it is necessary to apply a voltage even higher than that during the normal start-up in the conventional drive control method and apparatus. In such a structure, all the components including the circuit element acting as a component element of the drive control apparatus must be made pressure-resistant. As a result, the cost of the drive control apparatus is increased, and an apparatus having the motor installed therein becomes costly.

SUMMARY OF THE INVENTION

According to one aspect of the present invention, there is provided a vibration driven actuator apparatus capable of reliably start by switching it from a first vibration mode to a second vibration mode so that a vibration member and a contact member are moved relative to each other at a start-up time.

According to another aspect of the present invention, there is provided a vibration driven actuator apparatus capable of ensuring a reliable operation by switching it from a first vibration mode to a second vibration mode so that a vibration member and a contact member are moved relative to each other when a relative movement speed between the vibration member and the contact member is decreased.

According to still another aspect of the present invention, there is provided a vibration driven actuator apparatus capable of ensuring a reliable operation by switching it from a first vibration mode to a second vibration mode so that a vibration member and a contact member are moved relative to each other on the basis of a change in the vibration state of the vibration member.

The above and further objects, aspects and novel features of the invention will more fully appear from the following detailed description when the same is read in connection with the accompanying drawings. It is to be expressly understood, however, that the drawings are for the purpose of illustration only and are not intended to limit the invention.

DETAILED DESCRIPTION OF THE PREFERRED EMBODIMENTS

Preferred embodiments of the present invention will be explained below with reference to the accompanying drawings. Prior to the explanation of the embodiments, the conditions for starting the vibration-wave actuator, and the basis of the conception of the present invention, will be explained first. In the following description, a conventional ultrasonic-wave motor having a construction as shown in FIG. 1(b) will be used as an example.

Figure 1A:
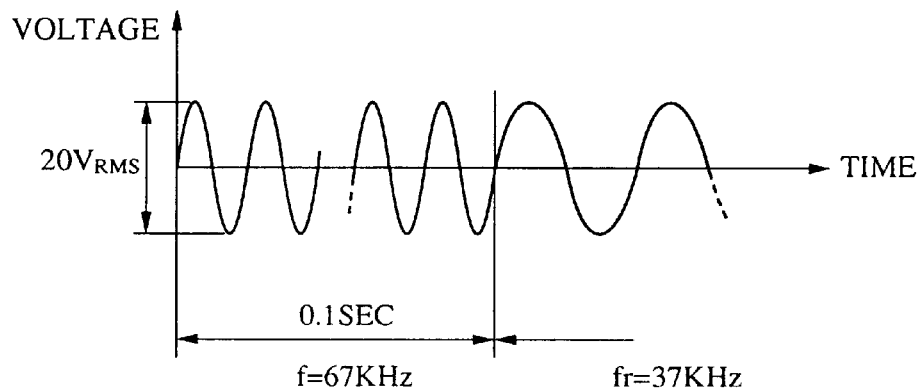
FIG. 1(a) shows the waveform of an alternating voltage for exciting the vibration member of the actuator when the vibration-wave actuator is started in accordance with the drive control method of the present invention.
Figure 1B:
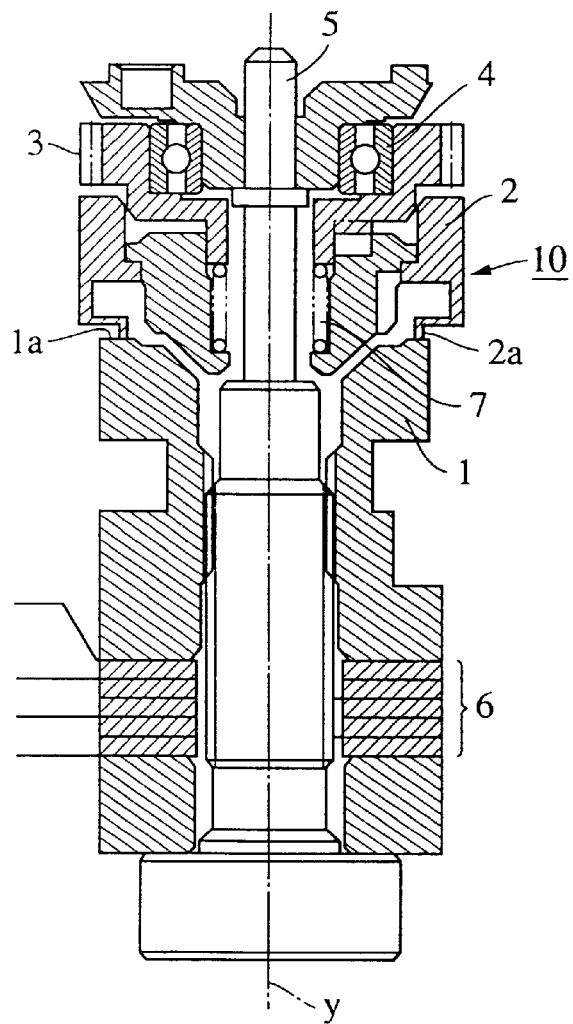
FIG. 1(b) is a sectional view illustrating an example of a vibration-wave actuator which is driven and controlled in accordance with a vibration control method of the present invention.

In FIG. 1(b), reference numeral 1 denotes a vibration member of an ultrasonic-wave motor 10; reference numeral 2 denotes a relative moving member (i.e., a rotor or contact member) rotated about the axis y while in pressure-contact with an end surface 1a of the vibration member 1; reference numeral 3 denotes a gear which rotates as a single unit with the moving member 2; reference numeral 4 denotes a spherical bearing engaged with the gear 3; reference numeral 6 denotes a group of piezoelectric elements held between two portions of the vibration member 1; and reference numeral 7 denotes a spring for pressing (urging) a collar portion 2a of the end portion of the rotor 2 in pressure-contact with the end surface 1a of the vibration member 1. The collar portion 2a is made of a thin annular member as shown. The collar portion 2a is formed in such a way that it is elastically displaceable (so as to work as a spring) along an axis with respect to the end surface of the vibration member 1.

Figure 2:
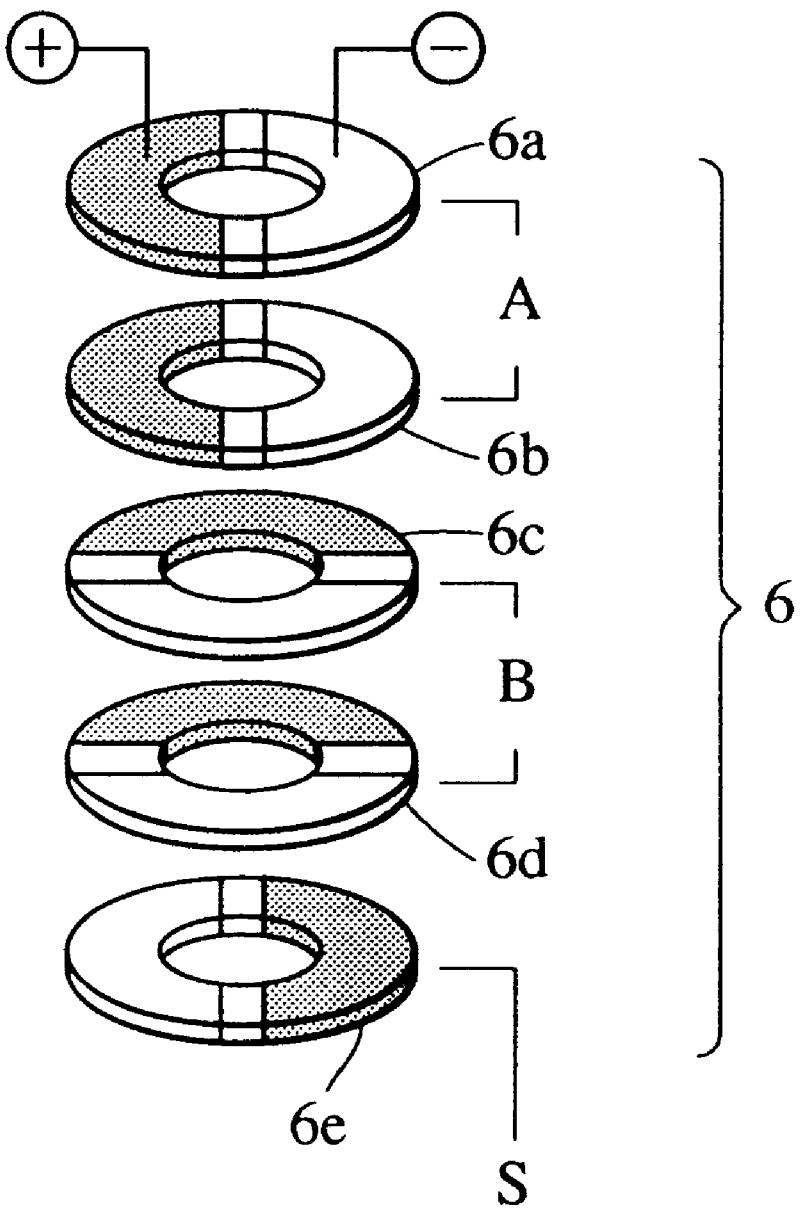
FIG. 2 is an exploded perspective view of a piezoelectric element serving as an excitation element built in the vibration-wave actuator shown in FIG. 1.

The group of piezoelectric elements 6, as shown in FIG. 2, comprises first piezoelectric elements 6a and 6b (for A phase) to which a first alternating voltage for generating vibrations in the vibration member 1 is applied, second piezoelectric elements 6c and 6d (for B phase) to which a second alternating voltage different from the alternating voltage applied to the first piezoelectric elements 6a and 6b is applied, and a piezoelectric element 6e (for S phase) for detecting the vibration state of the vibration member 1. The group of piezoelectric elements 6 are electrically connected to a drive control circuit, which will be described later. Since the general structure of ultrasonic-wave motor 10 is known (see e.g., Japanese Patent Laid-Open No. 4-150781), only the construction related to the present invention will be explained in this specification. The ultrasonic-wave motor generates a jump-rope type vibration by superimposing two primary bending vibrations at right angles to each other (resonance vibration member $f_r$ at approximately 37 kHz) in the vibration member 1, and the rotor 2 which is pressed against the end surface of the vibration member 1 is caused to rotate about the axis y.

Next, conditions under which the ultrasonic-wave motor can start even if the vibration member 1 is in close contact with the rotor 2 will be considered.

Motor Starting Model 1

Figure 4A:
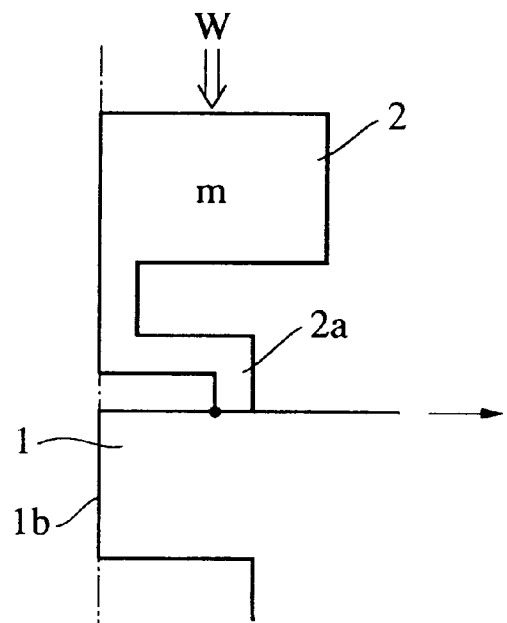
FIGS. 4(a) and 4(b) illustrate the movements of a vibration member and a rotor of the vibration-wave actuator shown in FIG. 1.
Figure 4B:
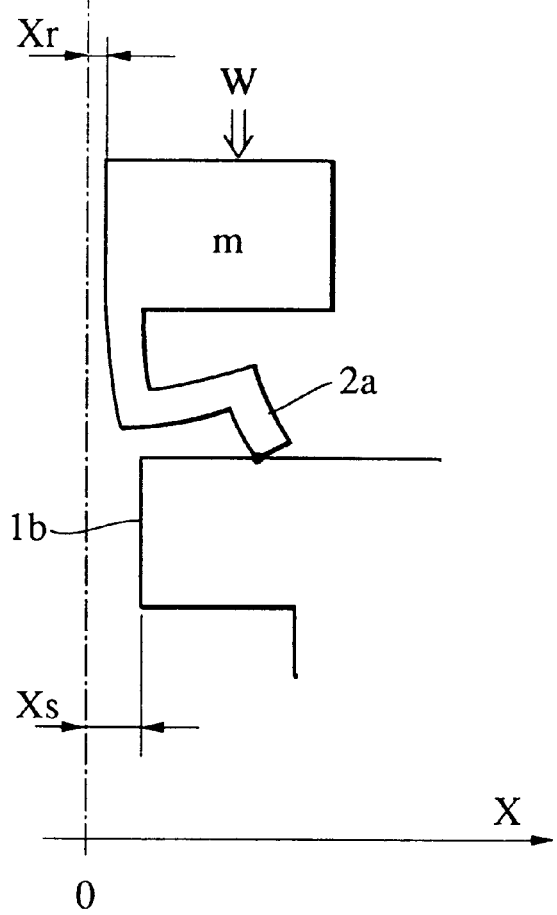

FIGS. 4(a) and 4(b) show an enlarged diagram of the portion where the vibration member 1 contacts the rotor 2.

FIG. 4(a) shows these elements in a natural or rest state. FIG. 4(b) shows these elements in a displaced configuration. It is assumed that a vibration displacement is caused in the direction of the arrow W parallel to the side 1b of the vibration member 1. The spring constant of the collar portion 2a of the rotor 2 is denoted as k and the mass of the rotor 2 is m, and the side of the vibration member 1 is moved by an amount $x_s$ from the original position 0 in the direction of the arrow X (in x direction) during time t. In this case, the following motion equation ① holds:

$$m\ddot{x}r + k(x_s - x_r) = 0 \qquad (1)$$

where $x_r$ is a momentary position of an arbitrary point of the rotor 2 within the time t, and $x_s$ is a momentary position of an arbitrary point of the vibration member 1 within the time t.

The condition in which sliding occurs between the vibration member 1 and the rotor 2 is represented by:

$$k(x_s - x_r) > \mu w \qquad (2)$$

where $\mu$ is the stationary friction coefficient between the end surface 1a of the vibration member 1 and the collar portion 2a of the rotor 2, and w is the sum of the close-contact force and the force which presses the rotor 2 against the vibration member 1.

The momentary position $x_s$ of an arbitrary point of the vibration member 1 is denoted as $x_s = A \sin \omega t$ and the momentary position $x_r$ of an arbitrary point of the rotor 2 is denoted as $x_r = B \sin(\omega t + \phi)$. On the basis of these, $\dot{x}_r$ and $\ddot{x}_r$ are determined. Substitution of these in equation ① gives – $m\omega^2 B \sin(\omega t + \phi) + k\{A \sin \omega t - B \sin(\omega t + \phi)\} = 0$.

Therefore, $(m\omega^2 + k) B \sin(\omega t + \phi) = k A \sin \omega t$. For both sides to be equal to each other, the following must be satisfied: $(m\omega^2 + k) B = kA$ and $\phi = 0$. Therefore, $B = kA/(m\omega^2 + k)$. Substitution of this into $x_r = B \sin(\omega t + \phi)$ gives $$x_r = \frac{kA}{m\omega^2 + k} \sin(\omega t + \phi).$$

Substitution of $x_r$ and $x_s$ into equation ② gives $$k\left(kA \sin \omega t - \frac{kA}{m\omega^2 + k} \sin \omega t\right) > \mu W \qquad (3)$$

Since the value of the left side of the equation becomes a maximum when $\omega t = \pi/2$ (i.e., $\sin \omega t = 1$), the following is obtained:

$$\frac{kAm\omega^2}{m\omega^2 + k} > \mu W \qquad (4)$$

Therefore, the following two conditions can be obtained regarding conditions for reliably making the left side of equation ④ larger:

(a) Making the amplitude A of the vibration member 1 larger (b) Making the frequency ω of the vibration member 1 larger. When equation ① is satisfied, the motor can be started even if the vibration member is brought into contact with the moving member.

Motor Starting Model 2

(Case in which influences caused by the vibration displacement of the vibration member along the axis are taken into consideration).

Figures 5A, 5B, 5C:
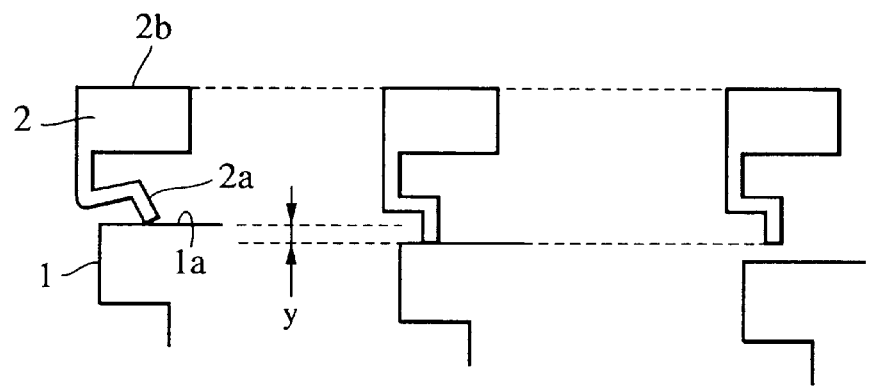
FIGS. 5(a) to 5(c) illustrate the movements of the vibration member and the rotor in the axial direction.

FIG. 5 illustrates changes in the positional relationship between the rotor 2 and the vibration member 1 when the vibration member 1 is vibration-displaced along the y axis. The rotor 2 (mass: m) is brought into pressure-contact with the end surface 1a of the vibration member 1 by means of a spring 7 (spring constant: k) as shown in FIG. 1. In the state of FIG. 5(a), the collar portion 2a (characteristic frequency: $f_2$) of the rotor 2 is elastically deformed. FIG. 5(b) illustrates a moment at which the vibration member 1 is displaced by an amount y along the y axis and the collar portion 2a of the rotor 2 is about to be separated from the end surface 1a of the vibration member 1, as shown in FIG. 5(c). When this happens, the collar portion 2a of the rotor 2 is no longer elastically deformed, and the front end of the collar portion 2a is in non-pressured contact with the end surface of the vibration member 1.

The characteristic frequency $f_1$ determined by the rigidity of the pressing spring 7 and the mass of the rotor 2 is $f_1 = 2\pi\sqrt{k/m}$. If it is assumed that $f_1 << f_r$, and if the characteristic frequency $f_2$ of the collar portion 2a is sufficiently higher than the drive frequency $f_r$ of the vibration member 1, then the top surface 2b of the rotor 2 remains stationary as shown in FIG. 5(b). In this case, $f_1 << f_r << f_2$, and for the motor to start, the vibration member 1 must be displaced by an amount y indicated in the figure. That is, the vibration member 1 must be vibrated at an amplitude y.

When $f_1 > f_2$, it is useless to provide the collar portion 2a in the rotor 2. When $f_r < f_1 < f_2$, since y is so small that it cannot be compared with the stroke of the spring 7, the top surface 2b of the rotor 2 follows the vibration of the vibration member 1, preventing the motor from starting.

Motor Starting Model 3

(Case of $f_1 < f_2 < f_r$)

In this case, since the collar 2a is vibrated at a free cycle with respect to the vibration of the vibration member 1, it becomes possible to start the motor at a value non-comparable with the value of x or y. However, the motor normally cannot be driven unless $f_r < f_2$ is reached after starting.

As in the three types of starting models described above, in order to start the ultrasonic-wave motor, it is necessary to control the amplitude or frequency of the vibration in the vibration member.

The drive control method and apparatus of the present invention are based on the above hypothesis and considerations regarding the starting of an ultrasonic-wave motor. Embodiments of the present invention will now be explained below. Since an ultrasonic-wave motor for use with the drive control technology of the present invention has already been described, an explanation regarding its construction will be omitted.

First Embodiment

Figure 3:
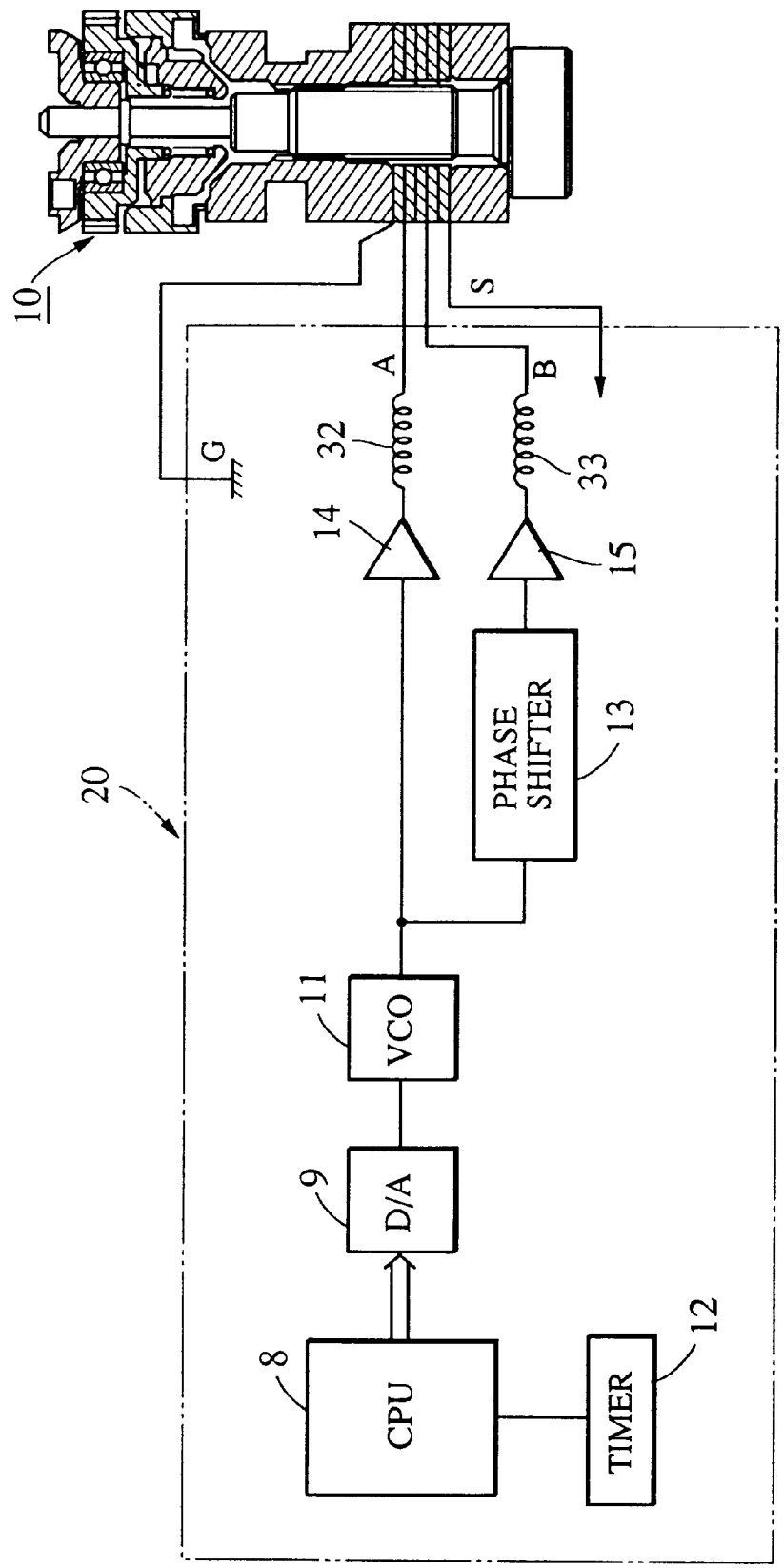
FIG. 3 is a schematic view illustrating the construction of a first embodiment of a drive control apparatus for performing a vibration control method of the present invention.

FIG. 3 illustrates the construction of the apparatus for performing a drive control method according to a first embodiment of the present invention on the above-described ultrasonic-wave motor 10. An explanation of the construction of the ultrasonic-wave motor 10 is omitted.

In FIG. 3, reference numeral 8 denotes a main control apparatus 20 (hereinafter abbreviated as a CPU) composed of a microcomputer or the like contained in a drive control apparatus for controlling the ultrasonic-wave motor 10; reference numeral 9 denotes a D/A converter for converting digital drive signals generated from the CPU 8 into analog drive signals; reference numeral 11 denotes a variable frequency oscillator (hereinafter abbreviated as a VCO) for generating an alternating voltage of a frequency corresponding to the voltage of a drive signal, which oscillator is driven in accordance with the analog drive signals generated from the D/A converter 9; reference numeral 14 denotes a power amplifier (hereinafter abbreviated as an amplifier) for amplifying the voltage output from the VCO 11; reference numeral 13 denotes a phase shifter for shifting the phase of the voltage output from the VCO 11; reference numeral 15 denotes a power amplifier (hereinafter abbreviated as an amplifier) for amplifying an alternating voltage which is made out of phase with the VCO by a predetermined phase (90° in this embodiment); and reference numerals 32 and 33 denote matching coils. The S-phase piezoelectric element 6e for detecting the vibrating state of the ultrasonic-wave motor 10 is connected through wiring or the like to an unillustrated circuit within the drive control apparatus 20.

In the drive control apparatus 20 of this embodiment, a timer 12 for controlling the timing at which a signal for driving the CPU 8 is generated is connected to the CPU 8 in order to perform the drive control method (a starting method) of this embodiment. An internal timer of the CPU 8 may be used in place of the timer 12.

In the drive control method of this embodiment, when the ultrasonic-wave motor 10 is started, first the CPU 8 outputs a drive signal for generating an alternating voltage of a frequency of 67 kHz to the first D/A converter 9. Thereupon, a drive signal of 20 $V_{RMS}$ which has been converted into analog signals by the D/A converter 9 is applied to the VCO 11. The CPU 8 sets the timer 12 at 0.1 sec.

The VCO 11 generates an alternating voltage of 20 $V_{RMS}$ at a frequency of 67 kHz in response to the drive signal input from the D/A converter 9 as shown in FIG. 1(a). The alternating voltage is amplified by the amplifier 14 and then applied to the A-phase piezoelectric elements 6a and 6b of the ultrasonic-wave motor 10 via a coil 32. The same alternating voltage is input to the phase shifter 13 where it becomes a voltage whose phase is delayed by 90°. After the voltage is amplified by the amplifier 15, it is applied to the B-phase piezoelectric elements 6c and 6d of the ultrasonic-wave motor 10 via a coil 33 (a first vibration mode). Therefore, secondary bending vibration is generated in the vibration member 1. The primary and secondary resonance frequencies of the vibration member 1 are 37 kHz and 67 kHz, respectively. Since the frequency of the alternating voltage applied to the first piezoelectric elements 6a to 6d is a resonance frequency in the secondary bending vibration of the vibration member, the vibration member enters a resonance state. As a result, the rotor 2 begins a relative rotary motion with respect to the vibration member 1, causing the motor 10 to be started. As soon as the motor 10 has started, this fact is detected by the S-phase piezoelectric element 6e and this detection is fed back to the drive control apparatus 20.

The generation of an alternating voltage of a frequency of 67 kHz by the VCO 11 is continued for 0.1 sec, after which the CPU 8 changes the drive signal to 37 kHz in response to a signal from the timer 12. As a result of this change, the alternating voltage generated by the VCO 11 is changed to an alternating voltage having a frequency of 37 kHz and a voltage of 20 $V_{RMS}$, as shown in FIG. 1(a). Therefore, the vibration member 1 of the ultrasonic-wave motor 10 is vibrated at a resonance frequency of 37 kHz, and the motor enters a normal operating state (a second vibration mode).

It was confirmed by an experiment that the starting of the motor by a drive control method of this embodiment accords with the above-described starting model 1. That is, it was confirmed by this experiment that a linear correlation is satisfied between the holding torque of the rotor 2 and the starting voltage.

The experiment conducted by the inventors of the present invention confirmed the following facts:

(A) When an alternating voltage of a frequency of 37 kHz, a resonance frequency of the primary bending vibration of the vibration member 1, was applied to the piezoelectric element at the beginning of the experiment, the motor was not started if there was a suction or close contact between the vibration member and the rotor, even if the applied voltage was changed to 40 $V_{RMS}$. However, when, as in the method of this embodiment, an alternating voltage of a frequency of 67 kHz (the resonance frequency during the secondary bending vibration of the vibration member 1) was applied for a short time (e.g., 0.1 sec), it was always possible to easily start the motor (even if the vibration member was in suction contact with the rotor).

(B) When the size of the amplitude of the vibration member 1 in a direction parallel to the surface thereof in the case in which a 20 $V_{RMS}$ alternating voltage at a frequency of 37 kHz was applied (a conventional starting method) was compared with the size of the amplitude in the case of the starting method of this embodiment (after a 20 $V_{RMS}$ alternating voltage at a frequency of 67 kHz was first applied, a 20 $V_{RMS}$ alternating voltage had a frequency of 37 kHz was applied), it was found that the amplitude of the vibration member in the case of the starting method of this embodiment was larger (the motor was not reliably started according to the conventional method).

(C) When the rotor was brought into pressure-contact with the vibration member at a spring pressing pressure of 4N, the contact surface between the rotor and the vibration member was oiled to decrease the holding torque of the rotor, and the motor in this state was started in accordance with the starting method of this embodiment and with the conventional starting method. The results showed that when oiling was performed to decrease the holding torque of the rotor, the starting voltage was also decreased. Therefore, it was confirmed that the starting method of this embodiment is based on the above-described starting model 1.

Although in this embodiment an alternating voltage of a frequency of 67 kHz (the resonance frequency of the secondary bending vibration of the vibration member 1) was applied for 0.1 sec at a start-up time, the frequency may be 67 kHz or thereabouts, that is, it need not be limited to 67 kHz. Also, the application time may be much shorter than 0.1 sec. For example, a frequency of 67 kHz or thereabouts merely may be scanned. When an alternating voltage having a frequency of 67 kHz is applied to the piezoelectric element of the motor, traveling-wave vibrations may not be generated in the vibration member 1. However, even if only standing-wave vibrations are generated in the vibration member 1, the motor can be started (for example, when the alternating voltage of a frequency of 67 kHz is applied, it is effective to apply the voltage to only the A-phase piezoelectric elements.)

In the starting method of this embodiment, as an alternating voltage to be applied to the piezoelectric element, a voltage in which an alternating voltage of 67 kHz and an alternating voltage of 37 kHz are superimposed on each other may be used.

Since the factor which impedes the starting of the motor is the presence of water as described earlier, a means for preventing water from being present as much as possible is provided in the motor. More specifically, a polymer having a water and oil repellent effect is coated near the sliding surface (close-contact surface) between the vibration member and the rotor. In this embodiment, after the polymer is mixed into a fluoroacrylate copolymer solvent (perfluorocarbon), it is coated onto this surface.

Second Embodiment

Figure 6:
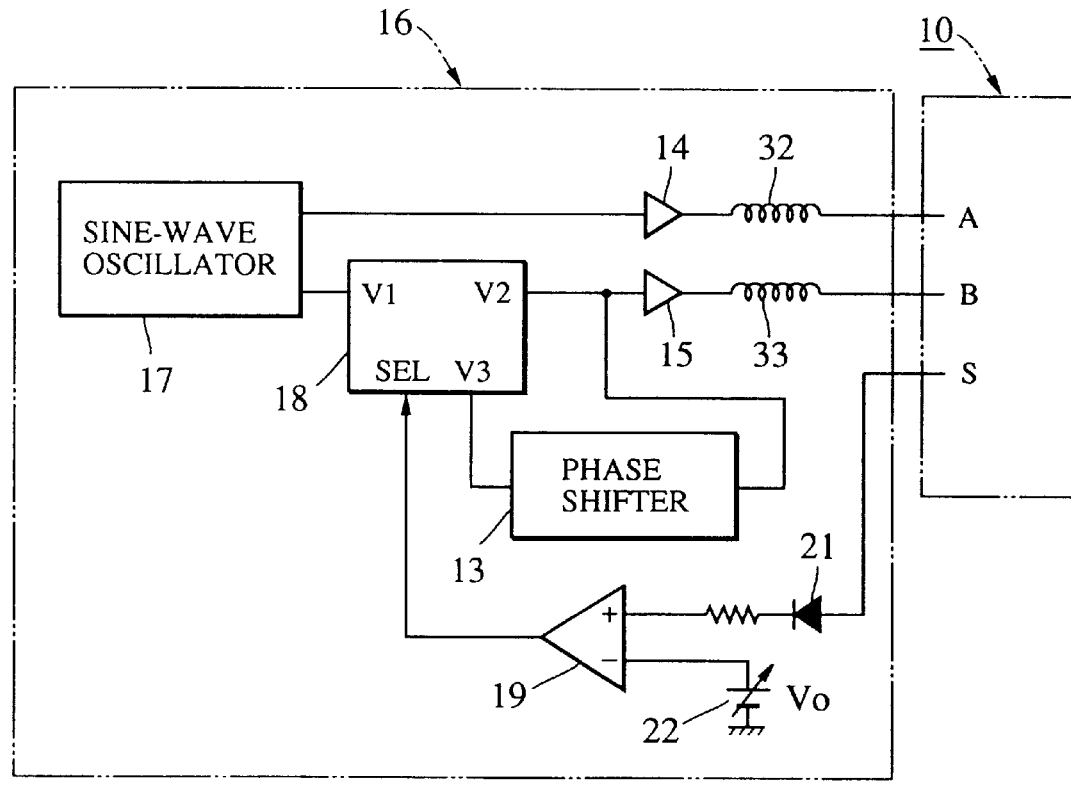
FIG. 6 illustrates a second embodiment of a drive control apparatus of the present invention.

FIG. 6 illustrates the construction of a drive control apparatus 16 in accordance with a second embodiment of the present invention. In the drive control apparatus 16, a selector 18 is disposed in the circuit associated with the B-phase piezoelectric elements, the phase shifter 13 is connected between a first output terminal V2 of the selector 18 and a second output terminal V3 thereof, a comparator 19 is disposed in the S-phase detection circuit, and the output terminal of the comparator 19 is connected to a selected-signal input terminal SEL of the selector 18. A sinewave oscillator 17 is disposed in the circuit in place of the CPU 8 of the first embodiment, the output from the sinewave oscillator 17 is applied to the A-phase piezoelectric elements of the ultrasonic-wave motor via the amplifier 14, and the signal for driving the B-phase piezoelectric elements is input to an input terminal V1 of the selector 18. Reference numeral 22 denotes a variable power source for varying a reference value in the comparator 19; and reference numeral 21 denotes a diode for converting the S-phase output signals into direct current.

The output of the S-phase piezoelectric elements of the ultrasonic-wave motor 10 does not reach the reference value of the comparator 19 before the ultrasonic-wave motor 10 is started (since the motor 10 is shown in FIG. 1, the illustration of the construction thereof is omitted). Since there is no output from the comparator 19, no signal is input to the terminal SEL of the selector 18. Therefore, the input terminal V1 of the selector 18 is connected to the first output terminal V2 thereof. The output from the sinewave oscillator 17 is amplified by the amplifier 14, after which it is applied to the A-phase piezoelectric elements of the ultrasonic-wave motor 10, while the output from the sinewave oscillator 17 is input to the amplifier 15 via the terminals V1 and V2 of the selector 18. This output is amplified by the amplifier 15, and then applied to the B-phase piezoelectric elements of the ultrasonic-wave motor 10. Since an alternating voltage of the same phase is applied to the A-phase and B-phase piezoelectric elements of the ultrasonic-wave motor 10, standing wave vibrations are generated in the vibration member of the ultrasonic-wave motor 10 (the first vibration mode). In this case, since an alternating voltage of the same phase is applied to both the A-phase and the B-phase piezoelectric elements, the amplitude of the standing wave vibrations generated in the vibration member becomes $\sqrt{2}$ times the amplitude of the traveling-wave vibrations generated in the vibration member in the normally operating state of the ultrasonic-wave motor 10. Therefore, the vibration member is excited with a vibration having an amplitude larger than that during the normal operation before the motor is started. In this manner, it is possible to easily start the motor in this embodiment.

When the rotor of the ultrasonic-wave motor 10 begins to move (the motor is started), the output from the S-phase piezoelectric elements of the motor becomes greater than the reference value of the comparator 19, causing the comparator 19 to generate an output. Upon this output being input to the terminal SEL of the selector 18, the connecting state within the selector 18 is switched, so that the input terminal V1 is connected to the second output terminal V3. As a result, the sinewave alternating voltage which has been applied to the B-phase piezoelectric elements of the ultrasonic-wave motor 10 via the terminals V1 and V2 is, after this point in time, applied from the output terminal V3 through the phase shifter 13 to the B-phase piezoelectric elements of the ultrasonic-wave motor 10.

Since the phase of the alternating voltage applied to the B-phase piezoelectric elements is delayed by 90° by the phase shifter 13, a traveling wave vibration is generated in the vibration member of the ultrasonic-wave motor 10 by the combination of the alternating voltage applied to the A-phase piezoelectric elements and the alternating voltage applied to the B-phase piezoelectric elements (the second vibration mode). As a result, the ultrasonic-wave motor 10 enters a normal operating state, in which the rotor is driven by traveling-wave vibrations generated in the vibration member.

Other circuits may be used in place of the selector 18 so that the phase of the alternating voltage applied to the B-phase piezoelectric elements is varied so that it becomes gradually closer to the phase of the alternating voltage applied to the A-phase piezoelectric elements.

Although in this embodiment it is detected whether the motor has been started normally on the basis of a signal output from S-phase piezoelectric elements of the motor, signals output from an encoder or the like may be used for detecting the movement of the rotor of the ultrasonic-wave motor 10 in a non-contact manner.

Third Embodiment

Figure 7:
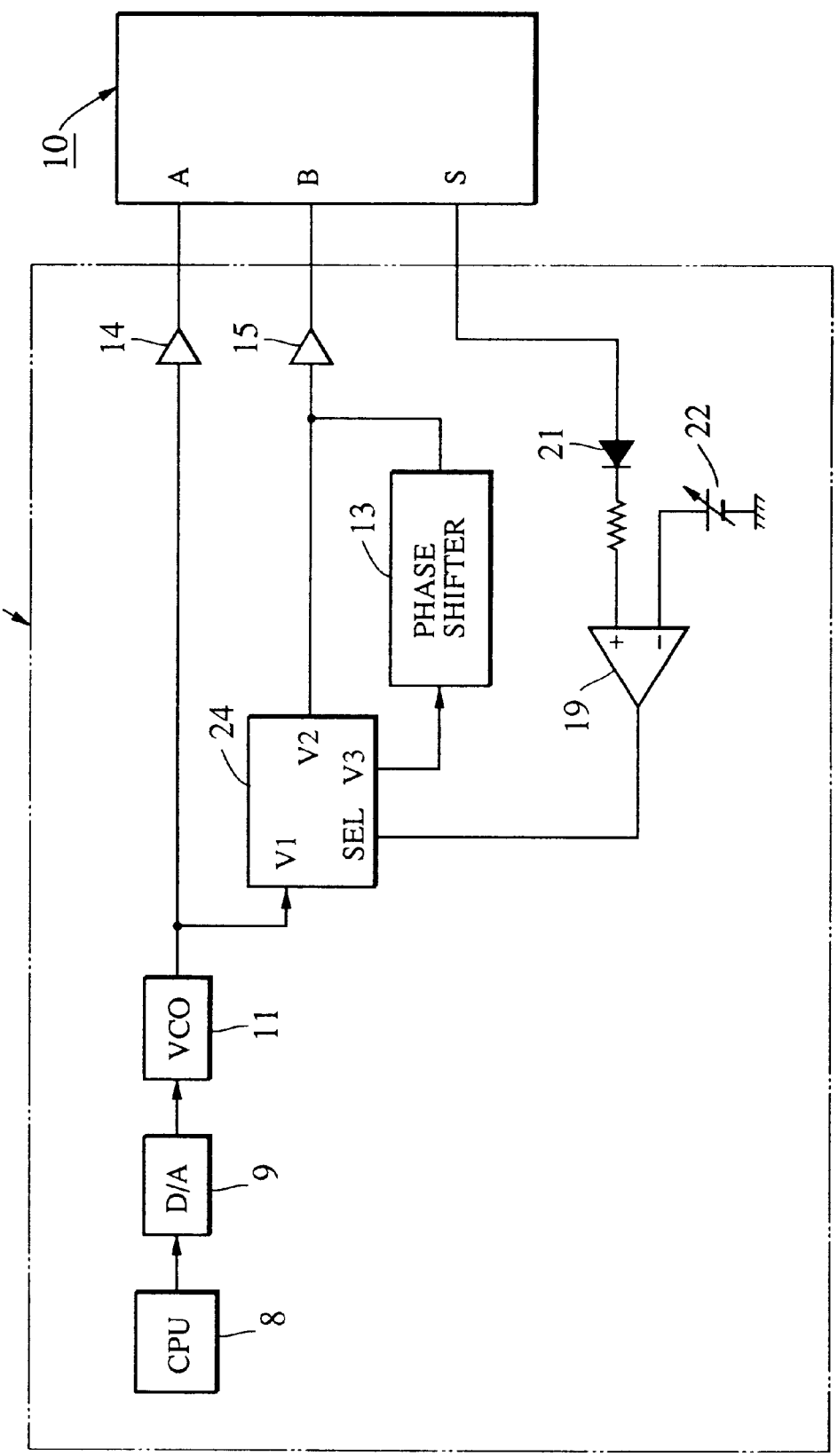
FIG. 7 illustrates a third embodiment of a drive control apparatus of the present invention.

FIGS. 7 and 8 illustrate a third embodiment of the present invention. A drive control apparatus of this embodiment is a modification of the drive control apparatus of the first embodiment. In the drive control method in this embodiment, the frequency of the drive alternating voltage is varied in relation to time when the ultrasonic-wave motor is started.

In a drive control apparatus 23 of the third embodiment shown in FIG. 7, the sinewave oscillator 17 of the previous embodiment is replaced with a CPU 8 in the drive control apparatus. Thus, the only difference between this embodiment and the second embodiment is that the apparatus of this embodiment is based on a digital control method while the apparatus of the second embodiment is based on an analog control method.

In FIG. 7, reference numeral 9 denotes a D/A converter; reference numeral 11 denotes a VCO; reference numeral 24 denotes a selector; reference numeral 13 denotes a phase shifter; reference numeral 19 denotes a comparator for detecting whether the S-phase detected output is higher or lower than a reference value; and reference numeral 21 denotes a diode for inputting only a DC component of the S-phase output to the comparator.

Figure 8A:
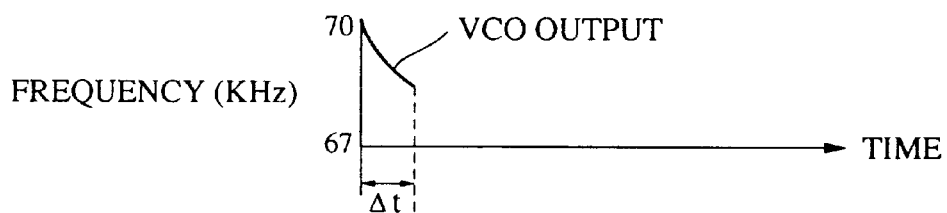
FIGS. 8(a) to 8(c) illustrate waveforms output from the essential portion of the circuit of FIG. 7 according to a drive control method of the present invention performed by the drive control apparatus of FIG. 7.
Figure 8B:
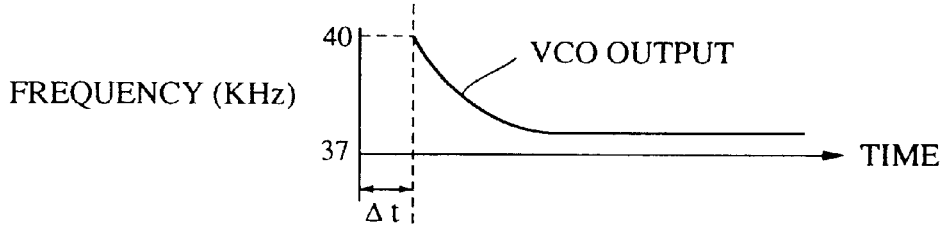
Figure 8C:
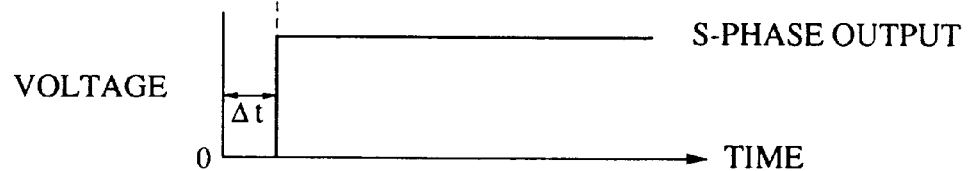

When the ultrasonic-wave motor 10 is started, the CPU 8 first generates a drive signal so that an alternating voltage whose frequency is gradually lowered from 70 kHz, which is higher than a resonance frequency 67 kHz of the secondary bending vibration of the vibration member 1 of the ultrasonic-wave motor 10, is generated in the VCO 11, as shown in FIG. 8(a). At this time, since the ultrasonic-wave motor 10 is not yet started, the signal generated from the S-phase electrode of the motor does not reach the reference value of the comparator 19, and thus there is no output from the comparator 19. Therefore, since there is no input to the selection signal input terminal SEL of a selector 24, the output terminal V3 of the selector 24 is connected to the first output terminal V2. When the signal output from the CPU 8 is applied to the VCO 11 via the D/A converter 9, the VCO 11 generates an alternating voltage whose frequency is gradually decreased as shown in FIG. 8(a), and the alternating voltage is amplified by the amplifier 14 and then applied to the A-phase piezoelectric elements of the ultrasonic-wave motor 10. Since an alternating voltage whose frequency varies as shown in FIG. 8(a) is applied to the A-phase piezoelectric elements of the ultrasonic-wave motor 10 in relation to time, standing wave vibrations of the same frequency as that of an input voltage are generated in the vibration member of the ultrasonic-wave motor 10 (the first vibration mode). The application of this alternating voltage is continued for a predetermined time of Δt sec, and rotation of the rotor of the motor is started during this period of time. If rotation of the rotor of the motor is started after a time lapse of Δt sec, then the output from the S-phase piezoelectric elements of the motor rises as shown in FIG. 8(c). Since the S-phase output now exceeds the set reference value of the comparator 19, an output is generated from the comparator 19. The output generated from the comparator 19 then is input to the terminal SEL of the selector 24, where the connecting state of the output terminal V3 to the first output terminal V2 is switched so that the input terminal V1 is connected to the output terminal V3.

On the other hand, the CPU 8 switches the drive signal by a self-contained timer after a lapse of Δt from when a first drive signal is generated (i.e., when the motor is started). After this point in time, as shown in FIG. 8(b), the CPU 8 causes an alternating voltage whose frequency is gradually decreased from 40 kHz to 37 kHz to be generated in the VCO 11. Therefore, during the time the ultrasonic-wave motor 10 is started, an alternating voltage whose frequency is varied as shown in FIG. 8(b) is generated from the VCO 11, and the alternating voltage is applied to the A-phase piezoelectric elements of the ultrasonic-wave motor 10 via the amplifier 14, while at the same time the alternating voltage is input to the output terminal V1 of the selector 24. Therefore, since the alternating voltage is input to the phase shifter 13 from the output terminal V3 of the selector 24, the phase of the alternating voltage is delayed by 90° by means of the phase shifter 13. This shifted alternating voltage is amplified by the amplifier 15, after which it is applied to the B-phase piezoelectric elements of the ultrasonic-wave motor 10 (the second vibration mode). As a result, traveling-wave vibrations for making the motor enter a normally operating state are generated in the vibration member 1, so that the vibration member 1 begins to vibrate at a frequency of 37 kHz, which is a resonance frequency during the primary bending vibration. Therefore, after the motor is started, the rotor 2 shifts from a transition state to a normally operating state.

Although in this embodiment the S-phase output of the ultrasonic-wave motor 10 is used to detect the starting of the ultrasonic-wave motor 10, an output from an encoder alternatively may be used for detecting the movement of the rotor of the motor. When the encoder is used to detect the starting of the motor, the comparator 19 does not need to be provided.

Fourth Embodiment

Figure 9:
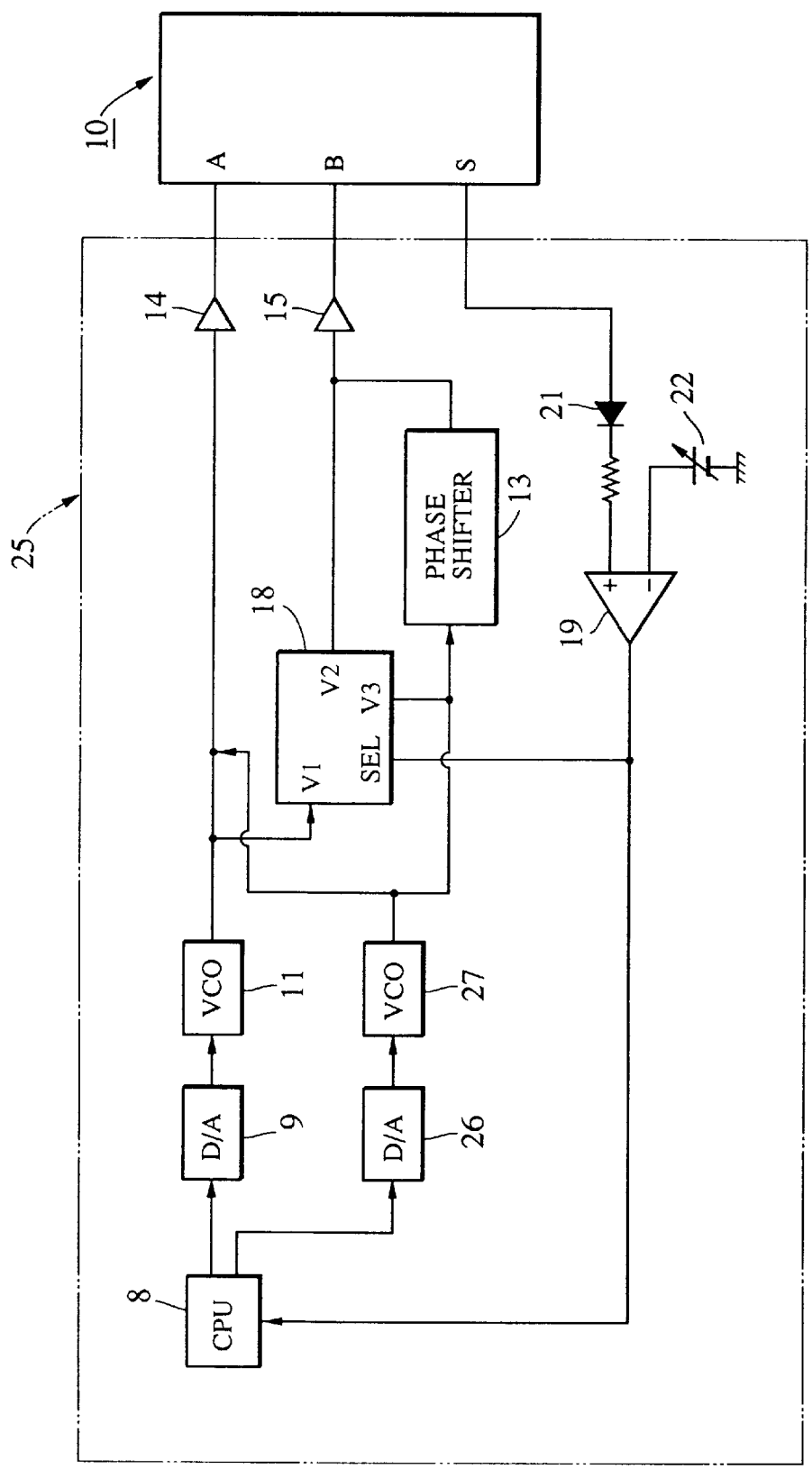
FIG. 9 illustrates the construction of a fourth embodiment of a drive control apparatus of the present invention.
Figure 10A:
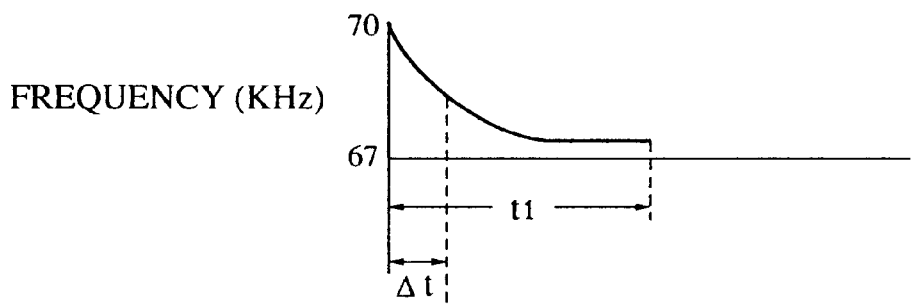
FIGS. 10(a) to 10(c) illustrate waveforms output from the essential portion of the circuit of FIG. 9 according to a drive control method of the present invention performed by the drive control apparatus of FIG. 9.

FIGS. 9 and 10(a) and (c) illustrate a fourth embodiment of the present invention. A feature of this embodiment is that alternating voltages of different frequencies are applied to piezoelectric elements after the ultrasonic-wave motor 10 is started so that the above-described close contact does not occur between the vibration member and the rotor for a predetermined period of time after the ultrasonic-wave motor 10 has been started.

Since the components in FIG. 9 designated by the same reference numerals as those in FIGS. 6 and 7 have already been explained in the above-described embodiments, an explanation thereof will be omitted. In a drive control apparatus 25 of this embodiment, a second D/A converter 26 and a second VCO 27 are connected to the drive circuits for the A-phase and B-phase piezoelectric elements of the ultrasonic-wave motor 10 in parallel to the above-described D/A converter 9 and the VCO 11. The second D/A converter 26 is connected to a second drive signal output port of the CPU 8. The output from the comparator 19 is also fed back to the CPU 8.

Next, a description will be given of the drive control method and the operation of the drive control apparatus 25 in this embodiment with reference to FIGS. 9 and 10(a) to (c).

Figure 10B:
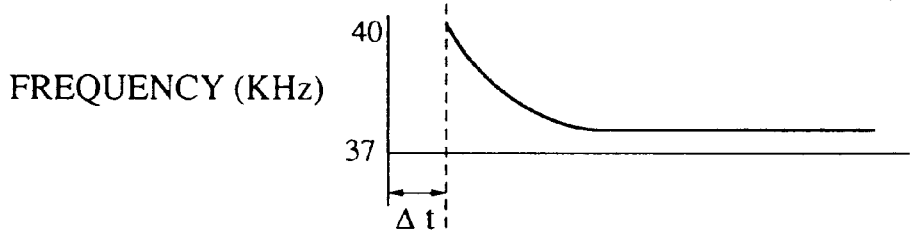
Figure 10C:
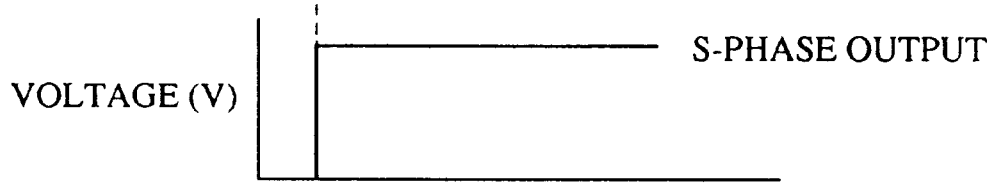

When the ultrasonic-wave motor 10 is started, first the CPU 8, generates a drive signal so that an alternating voltage whose frequency is gradually lowered from 70 kHz, which is higher than a resonance frequency 67 kHz of the secondary bending vibration of the vibration member 1 of the ultrasonic-wave motor 10, is generated from a first output port, as shown in FIG. 10(a), and the drive signal is input to the first VCO 11 via the first D/A converter 9. At this time, since the ultrasonic-wave motor 10 is not yet started, the signal generated from the S-phase electrode of the motor does not reach the reference value set in the comparator 19, and thus there is no output from the comparator 19. Therefore, a connection is made between the input terminal V1 of the selector 18 and the first output terminal V2 thereof. Also, since there is no output from the comparator 19, the CPU 8 only generates a first drive signal and outputs it to the first D/A converter 9 from the first output port. Therefore, when the signal output from the CPU 8 is applied to the VCO 11 via the D/A converter 9, the VCO 11 generates an alternating voltage whose frequency decreases from 70 kHz as shown in FIG. 10(a). The alternating voltage is amplified by the amplifier 14 and then applied to the A-phase piezoelectric elements of the motor 10. At the same time, the alternating voltage is input to the amplifier 15 from the first output terminal V2 of the selector 18 and amplified thereby, after which it is applied to the B-phase piezoelectric elements of the motor 10. Therefore, since an alternating voltage whose frequency varies in relation to time as shown in FIG. 10(a) is applied to the A-phase and B-phase piezoelectric elements of the motor 10, standing wave vibrations having the same frequency as that of the input voltage are generated in the vibration member of the motor 10 (the first vibration mode). When the application of this alternating voltage is continued for a predetermined time of Δt sec, the rotor of the motor is started during this period of time. Upon the starting of the rotor of the motor 10, the output from the S-phase piezoelectric elements of the motor rises, as shown in FIG. 10(c). When the S-phase output exceeds the reference value set in the comparator 19, an output is generated by the comparator 19. Since the output of comparator 19 is input to the terminal SEL of the selector 18, the connection between the input terminal V1 and the first output terminal V2 is cut off, and instead the input terminal V1 is connected to the second output terminal V3. Since the output from the comparator 19 also is input to the CPU 8, the CPU 8 generates a second drive signal from the second output port on the basis of the input from the comparator 19. The second drive signal is input to the second VCO 27 via the second D/A converter 26. As a result, the VCO 27, as shown in FIG. 10(b), generates an alternating voltage whose frequency decreases gradually from 40 kHz. This alternating voltage is amplified by the amplifier 14 and then applied to the A-phase piezoelectric elements of the motor 10. Also, the phase of the alternating voltage is delayed by 90° by means of the phase shifter 13, after which it is amplified by the amplifier 15 and applied to the B-phase piezoelectric elements of the motor 10.

Since a first drive signal, generated in the VCO 11, for varying the frequency as shown in FIG. 10(a), is generated from the first output port of the CPU 8 during this time, the first alternating voltage, which is the output from the VCO 11, continues to be applied to the A-phase piezoelectric elements of the motor 10 via the amplifier 14. The output from the VCO 11 also is input via the output terminal V3 of the selector 18 to the phase shifter 13 where its phase is delayed by 90°, after which it is amplified by the amplifier 15 and applied to the B-phase piezoelectric elements of the motor 10 (the second vibration mode).

More specifically, after the motor 10 is started, an alternating voltage of a frequency close to 67 kHz and an alternating voltage of a frequency close to 37 kHz are superimposed on the A-phase piezoelectric elements and the B-phase piezoelectric elements of the motor and applied, respectively. Since the phase of the alternating voltage applied to the B-phase piezoelectric elements is delayed by 90° from the phase of the alternating voltage applied to the A-phase piezoelectric elements, traveling-wave vibrations are generated in the vibration member 1. Therefore, the motor 10 shifts to a normally operating state. After a lapse of $t_1$ sec from the time when the CPU 8 started to generate the first drive signal (that is, when the frequency of the alternating voltage caused by the first drive signal becomes very close to 67 kHz), the CPU 8 stops generating the first drive signal. After this point in time, the drive alternating voltage of the motor 10 becomes an alternating voltage of a frequency close to 37 kHz, which is determined by the second drive signal (the third vibration mode).

As described above, since the vibration member of the motor is vibrated at the resonance frequency of the secondary bending vibration when an alternating voltage whose frequency is close to 67 kHz is being applied, the amplitude of the vibration member becomes a maximum. Therefore, there is no risk that the above-described close contact force phenomenon will occur between the vibration member and the rotor, and no risk that motor 10 erroneously will be suddenly stopped. If a situation in which the rotor is stopped in the period of time of $t_1$ occurs, there is no output from the comparator 19, thereby causing the CPU 8 to stop generating the second drive signal. Also, the selector 18 switches the connection between the input terminal V1 and the second output terminal V3 to a connection between the input terminal V1 and the first output terminal V2, and the alternating voltage of a frequency close to 67 kHz is applied to only the A-phase piezoelectric elements of the motor 10 so that vibration member 1 is placed in the standing-wave vibration state. A subsequent starting operation then is performed again.

Although in this embodiment the starting state is detected on the basis of the output from the S-phase piezoelectric elements of the motor 10, the starting state may, of course, be detected on the basis of the output from an encoder for detecting the movement of the rotor.

Fifth Embodiment

Figure 11A:
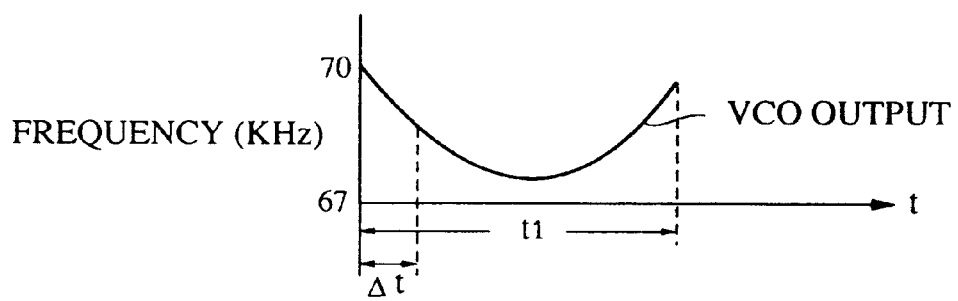
FIGS. 11(a) to 11(c) illustrate waveforms output from the essential portion of the circuit of FIG. 12 according to a drive control method of the present invention performed by a drive control apparatus of FIG. 12.
Figure 11B:
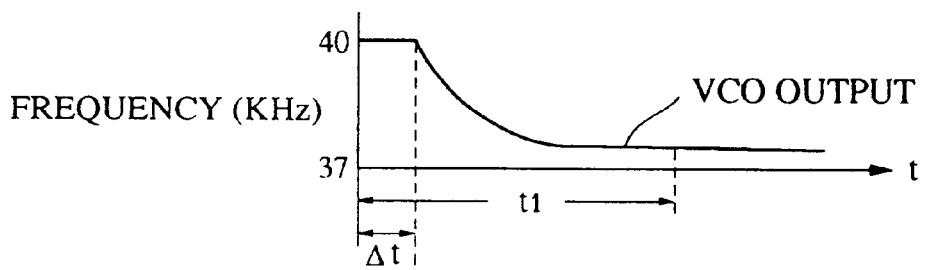
Figure 11C:

FIGS. 11(a) to 11(c) illustrate a VCO output in a fifth embodiment of the drive control method of the present invention. The drive control method of this embodiment is performed by a drive control apparatus 28 shown in FIG. 12. The construction of the drive control apparatus 28 is almost the same as that of the apparatus shown in FIG. 9, and only the selector differs. In the apparatus of this embodiment, the selector 24 used in the apparatus of FIG. 7 is used.

A feature of the drive control method of this embodiment is as follows. When starting the ultrasonic-wave motor 10, an alternating voltage whose frequency varies in a downward parabola in $t_1$ time from 70 kHz as shown in FIG. 11(a) is applied to the A-phase piezoelectric elements of the motor 10, and at the same time, an alternating voltage of a frequency of 40 kHz is applied to the piezoelectric element in the initial Δt time as shown in FIG. 11(b). After this point in time, an alternating voltage whose frequency varies in an asymptotic curve from 40 kHz to 37 kHz is applied to the piezoelectric element.

Figure 12:
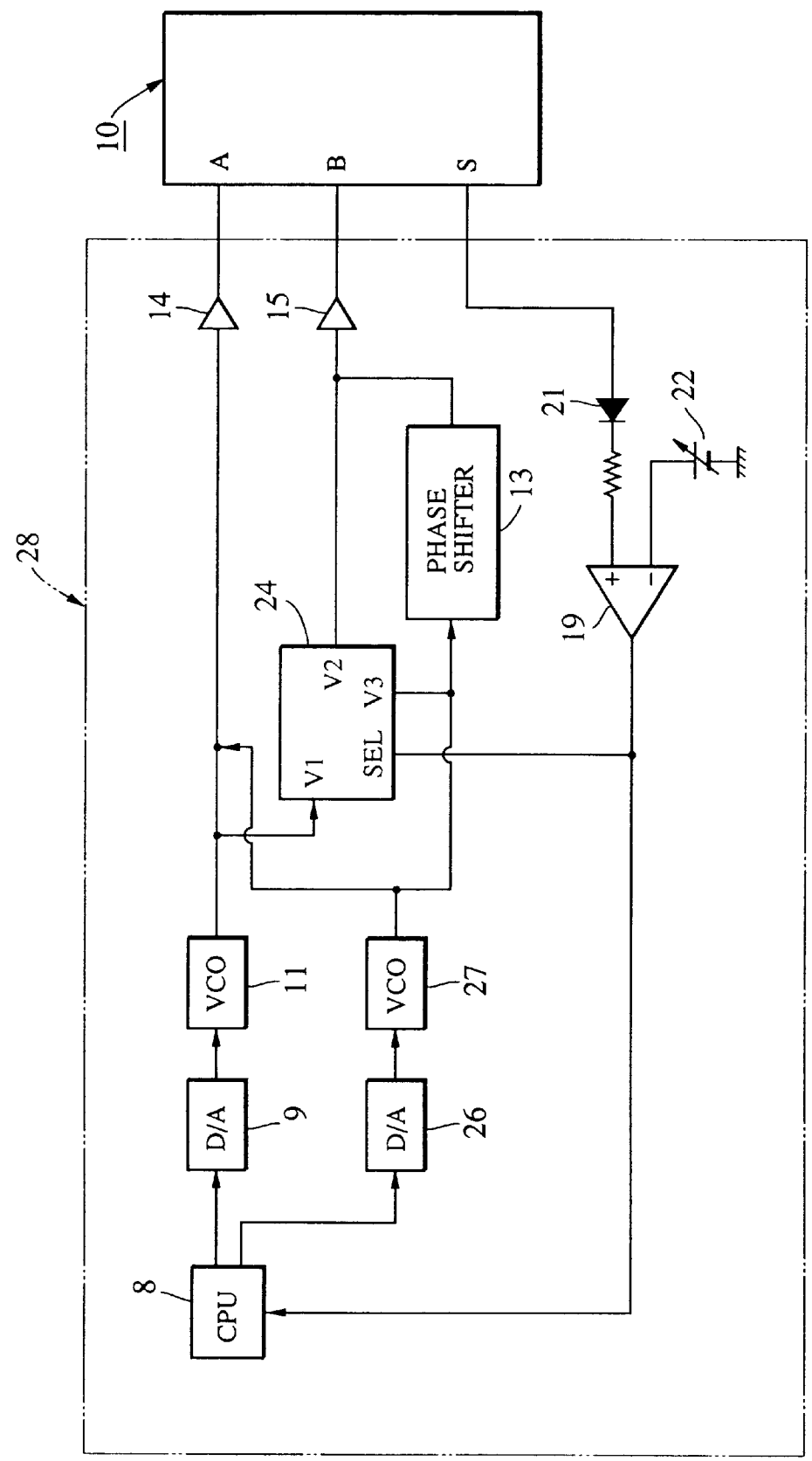
FIG. 12 illustrates a fifth embodiment of a drive control apparatus of the present invention.

The method of this embodiment and the operation of the drive control apparatus for performing the method of this embodiment will be explained below with reference to FIGS. 11 and 12.

When starting the motor 10, the CPU 8 generates a first drive signal for generating an alternating voltage whose frequency varies as shown in FIG. 11(a) from the VCO 11, and at the same time generates a second drive signal for causing the second VCO 27 to generate an alternating voltage whose frequency varies as shown in FIG. 11(b). After the first drive signal is converted into an analog signal by means of the first D/A converter 9, it is input to the first VCO 11 which then generates an alternating voltage whose frequency varies as shown in FIG. 11(a). The alternating voltage is amplified by the amplifier 14 and then applied to the A-phase piezoelectric elements of the motor 10. In this case, since rotation of the rotor of the motor 10 has not yet started, there is no output from the comparator 19. Therefore, since the terminal V3 of the selector 24 is connected to the terminal V2, there is no input to the B-phase driving amplifier 15 from the selector 24.

On the other hand, the second drive signal is input to the second VCO 27 via the second D/A converter 26, and the second VCO 27 generates an alternating voltage whose frequency varies as shown in FIG. 11(b). The alternating voltage is amplified by the amplifier 14 and then applied to the A-phase piezoelectric elements of the motor. At the same time, it is input to the phase shifter 13 where the phase is delayed by 90°, amplified by the amplifier 15 and then applied to the B-phase piezoelectric elements of the motor 10. In other words, before the motor is started, a first alternating voltage whose frequency varies as shown in FIG. 11(a) and an alternating voltage of a frequency of 40 kHz as shown in FIG. 11(b) are applied to the A-phase piezoelectric elements. Also, an alternating voltage having a frequency of 40 kHz and whose phase is delayed by 90° with respect to the voltage applied to the A-phase piezoelectric elements is applied to the B-phase piezoelectric elements (the first vibration mode). Therefore, traveling-wave vibrations caused by the alternating voltage of a frequency of 40 kHz and standing wave vibrations caused by the alternating voltage of a frequency of 67 kHz are generated in the vibration member of the motor 10. Since the frequency of the standing wave vibrations generated in the vibration member is close to the resonance frequency when the vibration member is at the secondary bending vibration, the amplitude of the standing wave vibrations is large. Therefore, the rotor of the motor can be easily started. The movement of the rotor is maintained by the traveling-wave vibrations caused in the vibration member by the alternating voltage of a frequency of 40 kHz.

When the rotor begins to move after a lapse of Δt sec, the output from S-phase piezoelectric elements of the motor 10 will exceed the reference value of the comparator 19, and an output will be generated by comparator 19. The output from comparator 19 is input to the CPU 8 and the SEL terminal of the selector 24. As a result, the input terminal V1 of the selector 24 is connected to output terminal V3 thereof, causing the first alternating voltage generated from the VCO 11, whose frequency varies as shown in FIG. 11(a), to be input to the phase shifter 13. Therefore, an alternating voltage whose phase is delayed by 90° is applied to the B-phase piezoelectric elements of the motor. As a result, traveling-wave vibrations caused by an alternating voltage whose frequency is close to 67 kHz are newly generated in the vibration member of the motor, and the above-described standing wave vibrations disappear. After the motor is started (when Δt sec has passed), the frequency of the first alternating voltage generated by the VCO 11 first decreases to a value close to 67 kHz as shown in FIG. 11(a) and then increases toward 70 kHz again. As a result, the amplitude of the vibration member of the motor caused by the alternating voltage becomes a maximum once and then decreases (the second vibration mode).

The frequency of the alternating voltage generated by the second VCO 27, after the motor is started, decreases exponentially toward 37 kHz as shown in FIG. 11(b). As a result, the amplitude of the vibration member (the amplitude of the primary bending vibration) caused by the alternating voltage increases.

The alternating voltage generated by the VCO 11 is cut off at time $t_1$. After this point in time, only the alternating voltage generated by the VCO 27 is applied to the A-phase and B-phase piezoelectric elements of the motor. Therefore, after time $t_1$, the vibration member of the motor is driven by an alternating voltage of a frequency close to 37 kHz (the third vibration mode).

According to this embodiment, as described above, two alternating voltages of different frequencies are applied to the vibration member of the motor before the motor is started, and after the motor is started an alternating voltage of a frequency close to the resonance frequency of the secondary bending vibration of the vibration member is applied during a predetermined period of time. Therefore, it is possible to prevent a force causing close contact between the vibration member and the rotor even after the motor is started.

The drive control method (the starting method) of this embodiment is based on the above-described starting model 1. When starting the motor, an alternating voltage of a frequency close to the resonance frequency of the secondary bending vibration of the vibration member is applied to the vibration member, making the starting operation easier.

Sixth Embodiment

A sixth embodiment of the drive control method of the present invention will be explained with reference to FIGS. 13(a) and 13(c). Since the construction of the drive control apparatus for performing the method of this embodiment is the same as that of the apparatus shown in FIG. 12 and explained in the fifth embodiment, an explanation of the apparatus is omitted.

Figure 13A:
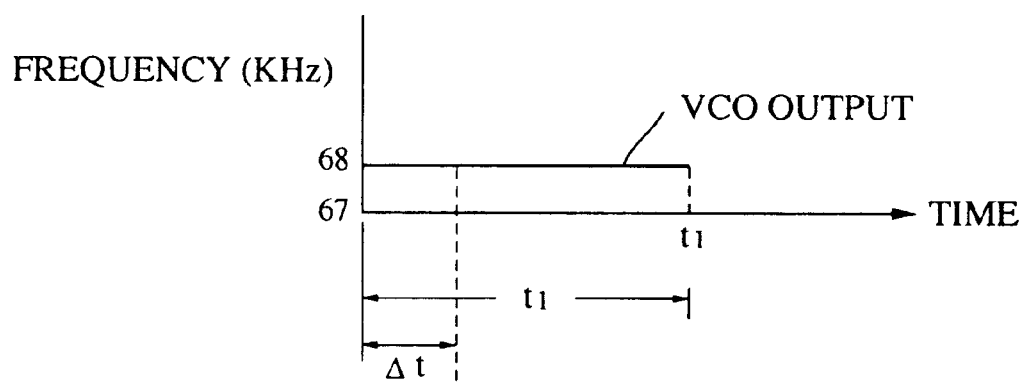
FIGS. 13(a) to 13(c) illustrate waveforms output from the essential portion of the circuit of FIG. 12 according to a drive control method of the present invention performed by the drive control apparatus of FIG. 12.
Figure 13B:
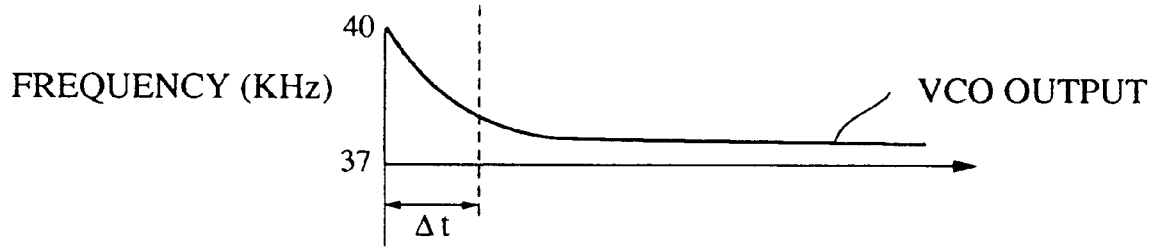
Figure 13C:
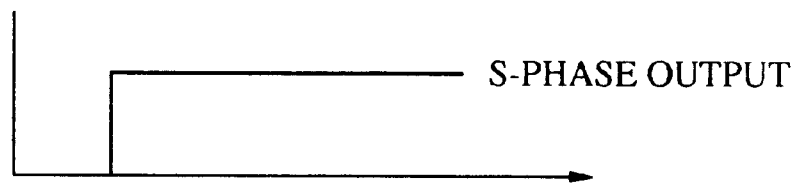

According to the drive control method (the starting method) of this embodiment, a first alternating voltage of a frequency of 68 kHz, close to the resonance frequency (67 kHz) when the vibration member of the motor is at the secondary bending vibration, is applied to the A-phase piezoelectric elements of the vibration member as shown in FIG. 13(a) before the motor is started so that standing wave vibrations are generated in the vibration member. Also, as shown in FIG. 13(b), a second alternating voltage whose frequency decreases from 40 kHz to 37 kHz in an asymptotic curve is applied to the A-phase and B-phase piezoelectric elements of the vibration member. Thus, traveling-wave vibrations due to the second alternating voltage are generated in the vibration member (the first vibration mode). After a point Δt in time when the rotor of the motor begins to move (i.e., the motor has started), the application of the alternating voltage of a frequency of 68 kHz is continued for some time (the second vibration mode). The application of the alternating voltage of a frequency of 68 kHz is stopped at time $t_1$ when there is no risk that the above-described close contact force will occur. After this point in time, traveling-wave vibrations are generated in the vibration member by applying an alternating voltage of a frequency close to 37 kHz (the resonance frequency of the primary bending vibration of the vibration member), thus maintaining the motor in a normally operating state (the third vibration mode).

The operation of the drive control apparatus for performing the method of this embodiment will readily be apparent to those skilled in the art, and a detailed description thereof will be omitted.

Seventh Embodiment

Figure 14A:
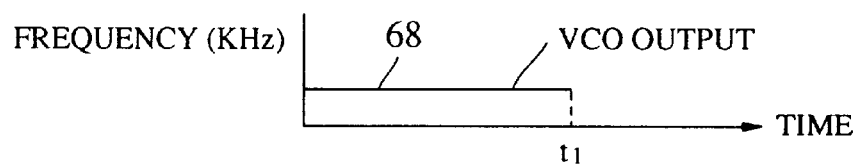
FIGS. 14(a) and 14(b) illustrate waveforms output from the essential portion of the control apparatus according to a drive control method of the present invention performed by a drive control apparatus of the present invention shown in FIG. 15.
Figure 14B:
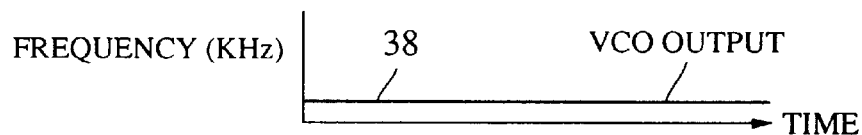
Figure 15:
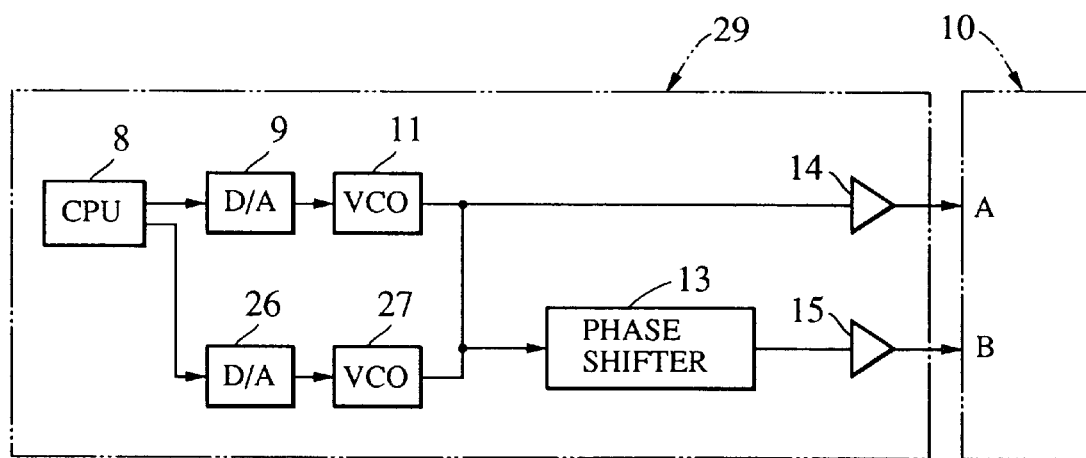
FIG. 15 illustrates a sixth embodiment of a drive control apparatus of the present invention.

FIGS. 14(a) and 14(b) illustrate a seventh embodiment of a drive control method of the present invention. FIG. 15 illustrates a drive control apparatus for performing a control method for the embodiment of FIGS. 14(a) and 14(b).

The method of this embodiment and the operation of the apparatus will be explained below.

When the ultrasonic-wave motor 10 is to be started, the CPU 8 outputs a first drive signal to the first D/A converter 9 and at the same time outputs a second drive signal to the second D/A converter 26. The moment that the drive signal converted into an analog signal by the first D/A converter 9 is input to the first VCO 11, the VCO 11 generates an alternating voltage of a frequency of 68 kHz as shown in FIG. 14(a). The alternating voltage is amplified by the amplifier 14 and then applied to the A-phase piezoelectric elements of the motor 10. The alternating voltage is also input to the phase shifter 13 where its phase is shifted by 90°, and the voltage is amplified by the amplifier 15 and applied to the B-phase piezoelectric elements of the motor 10.

When the second drive signal which has been converted into an analog signal by the second D/A converter 26 is input to the second VCO 27, the second VCO 27 generates an alternating voltage of a frequency of 38 kHz shown in FIG. 14(b). The alternating voltage is amplified by the amplifier 14 and then applied to the A-phase piezoelectric elements of the motor 10. In addition, the phase of the alternating voltage of a frequency of 38 kHz generated from the second VCO 27 is shifted by 90° by the phase shifter 13. This phase-shifted alternating voltage is amplified by the amplifier 15, after which it is applied to the B-phase piezoelectric elements of the motor 10 (the first vibration mode).

As a result, traveling-wave vibrations caused by the alternating voltages of frequencies of 68 kHz and 38 kHz are generated in the vibration member of the motor 10. After the vibration member of the motor 10 begins to move, the alternating voltage of a frequency of 68 kHz is applied to the piezoelectric element until a predetermined time $t_1$ is reached, and after time $t_1$, only the alternating voltage of a frequency of 38 kHz is applied to the piezoelectric element (the second vibration mode).

In this embodiment, since an alternating voltage of a frequency of 68 kHz close to the resonance frequency 67 kHz of the secondary bending vibration of the vibration member is applied to the vibration member of the motor before the motor is started, the amplitude of the vibration member becomes very large, making it possible to easily start the motor. In addition, since an alternating voltage of a frequency of 68 kHz is applied for some time after the motor is started, it is possible to prevent the occurrence of a close contact condition between the vibration member and the rotor in a condition in which the rotor is moving slowly.

Eighth Embodiment

Figure 16A:
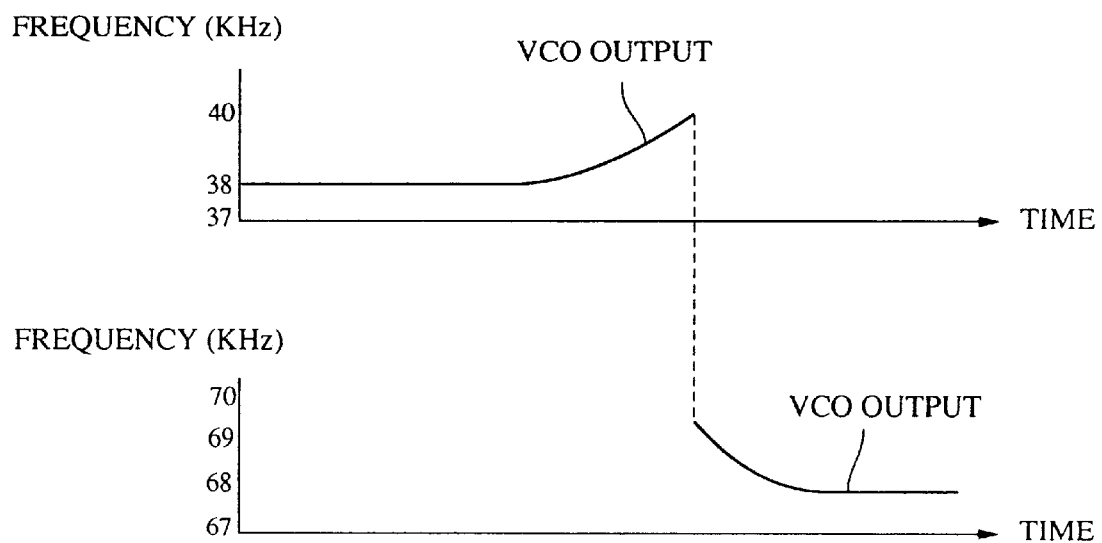
FIGS. 16(a) and 16(b) illustrate waveforms output from the essential portion of the control apparatus according to a drive control method of the present invention performed by a drive control apparatus of the present invention shown in FIG. 17.
Figure 16B:
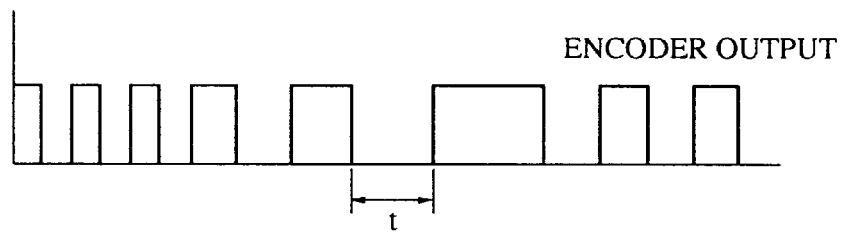

FIGS. 16(a) and 16(b) illustrate an eighth embodiment of a drive control method of the present invention. The construction of a drive control apparatus 30 for performing the method of this embodiment is shown in FIG. 17.

The method of this embodiment does not control the starting of the ultrasonic-wave motor 10, but is a drive control method which prevents the occurrence of a close contact condition between the vibration member and the rotor when the speed of the motor decreases.

During normal operation of the motor, as described above, since an alternating voltage of a frequency of 38 kHz is applied to the A-phase and B-phase piezoelectric elements of the vibration member, traveling-wave vibrations are generated in the vibration member (the first vibration mode). If the load on the rotor of the motor suddenly becomes too great during the operation of the motor, the drive control apparatus of the motor decreases the speed of the rotor so that the frequency of the alternating voltage for the vibration member is gradually varied to a frequency higher than 38 kHz, after which the frequency of the drive alternating voltage is instantaneously switched to a high frequency above 67 kHz which is the resonance frequency of the secondary bending vibration of the motor (the second vibration mode). Since the shifting of the frequency of the same drive voltage can be performed by the CPU 8, as described above, the construction of the apparatus for performing the method of this embodiment may be the same as that of the conventional apparatus shown in FIG. 17.

Figure 17:
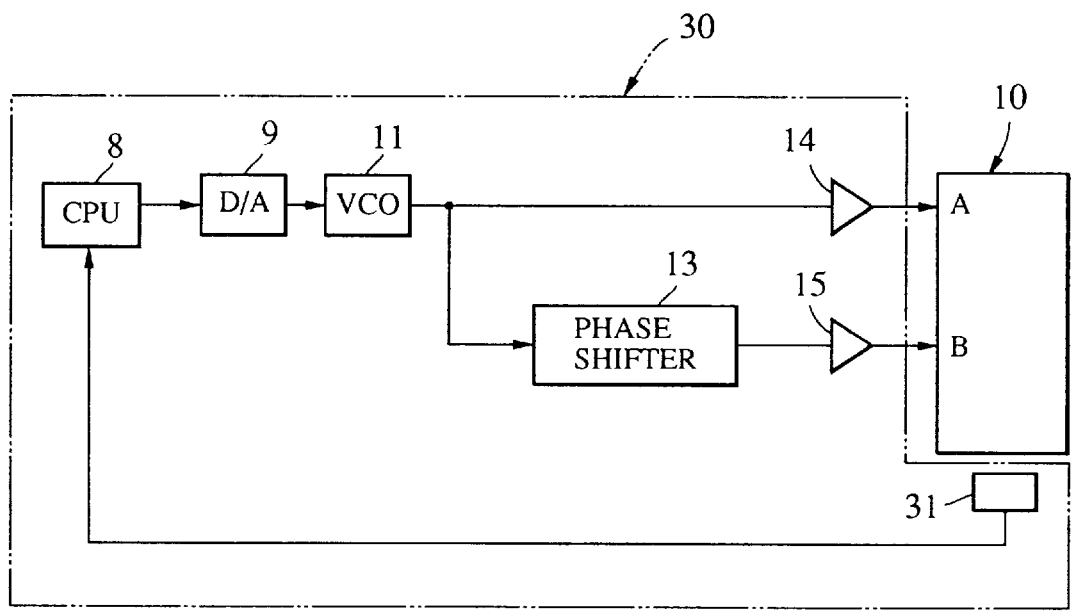
FIG. 17 illustrates the construction of a drive control apparatus for performing the method shown in FIG. 16.

In FIG. 17, reference numeral 31 denotes an encoder for detecting the movement of the rotor 2 of the ultrasonic-wave motor 10. FIG. 16(b) shows the output from the encoder when the movement speed of the rotor 2 is decreased suddenly due to a sudden increase in the load during the normal operation of the motor 10. When the speed of the rotor 2 is decreased suddenly, the duration t of the output pulses of an encoder 31 becomes longer as shown in FIG. 16(b).

The CPU 8, upon detecting this, varies the drive signal for the VCO 11 so that the frequency of the voltage applied to the vibration member is increased from 38 kHz to 40 kHz, as shown in FIG. FIG. 16(a), and then varies the drive signal supplied to the VCO 11 so that the frequency of the applied voltage becomes 70 kHz, which is close to the secondary resonance frequency 67 kHz. Further, the CPU 8 controls the VCO 11 so that the output frequency of the VCO 11 becomes 68 kHz, close to the secondary resonance frequency 67 kHz (the second vibration mode).

According to the above-described embodiments, if there is increased risk that there will be a force causing a close contact condition between the vibration member and the rotor because the speed of the rotor is decreased due to a sudden increase in the load, the frequency of excitation for the vibration member is changed to a frequency close to the resonance frequency of the secondary mode of the vibration member. Therefore, the amplitude of the vibration member becomes larger, and as a result, the unregulated stoppage of the rotor due to a close contact force between the vibration member and the rotor can be prevented.

According to the above-described various embodiments, by exciting the vibration member (so that a vibration of the actuator becomes close to the resonance frequency of another mode different from the vibration used for normal driving) when the vibration-wave actuator is started, or when the speed of the actuator is suddenly decreased or at a low speed, it is possible to reliably start the rotor (or maintain its movement) even if there is a force causing a close contact condition between the vibration member and the rotor. In addition, it is possible to easily start the rotor (or cause it to continue to move without stopping) even if a particularly high voltage is not applied to the excitation element of the vibration member. As a result, the drive control apparatus of the actuator need not be highly pressure resistant, and therefore it is possible to provide a highly controllable drive control apparatus without increasing the cost thereof.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. A vibration driven actuator apparatus, comprising:

a vibration member;

a contact member contactable with said vibration member and movable relative to said vibration member by a vibration generated in said vibration member; and a control circuit including means for first driving said vibration member in a first vibration mode in which the vibration member vibrates with a first single order of bending vibration at a start-up time, and then driving said vibration member in a second vibration mode in which the vibration member vibrates with a second single order of bending vibration different from said first single order of bending vibration after the start-up time.

2. An apparatus according to claim 1, wherein said first vibration mode has first vibration frequency components and said second vibration mode has second vibration frequency components different from said first vibration frequency components, and said first vibration mode contains vibration frequency components higher than vibration frequency components of said second vibration mode.

3. An apparatus according to claim 1, wherein said first vibration mode has a plurality of different vibration frequency components.

4. An apparatus according to claim 1, wherein said first vibration mode has a variable frequency component.

5. An apparatus according to claim 1, wherein said second vibration mode has a variable vibration frequency component that varies when said apparatus is switched from said first vibration mode to said second vibration mode.

6. An apparatus according to claim 2, wherein said first vibration mode has a variable vibration frequency component.

7. An apparatus according to claim 2, wherein said second vibration mode has a variable vibration frequency component that varies when the apparatus is switched from said first vibration mode to said second vibration mode.

8. An apparatus according to claim 3, wherein said first vibration mode has a variable vibration frequency component.

9. An apparatus according to claim 3, wherein said second vibration mode has a variable vibration frequency component that varies when the apparatus is switched from said first vibration mode to said second vibration mode.

10. An apparatus according to claim 1, wherein said first vibration mode includes the second vibration frequency components in said second vibration mode and at least one additional frequency component.

11. An apparatus according to claim 1, wherein said control circuit drives said vibration member in said first vibration mode at a start-up time, and drives said vibration member in said second vibration mode mode after a lapse of a predetermined time.

12. An apparatus according to claim 1, further comprising:

detecting means for detecting that said vibration member and said contact member have moved relative to each other.

13. An apparatus according to claim 12, wherein said detecting means includes a mechanical-electrical conversion element, and detects a relative movement between the vibration member and the contact member on the basis of a change in an electrical output from said conversion element.

14. An apparatus according to claim 12, further comprising:

a drive mechanism rotatably driven by rotation of said contact member.

15. A vibration driven actuator apparatus, comprising:

a vibration member;

a contact member contactable with said vibration member and movable relative to said vibration member by a vibration generated in said vibration member; and a control circuit including means for generating in said vibration member first vibration frequency components for driving said vibration member in a start-up driving mode, in which the vibration member vibrates with a first single order of bending vibration, and for generating in said vibration member additional vibration frequency components for driving said vibration member in a normal driving mode, in which the vibration member vibrates with a second single order of bending vibration different from said one order of bending vibration.

16. An apparatus according to claim 15, wherein said additional frequency components alone are insufficient for driving said vibration member so that said vibration member and said contact member move relative to each other.

17. An apparatus according to claim 15, wherein said additional frequency components alone are sufficient for driving said vibration member so that said vibration member and said contact member move relative to each other.

18. An apparatus according to claim 15, wherein said additional frequency components have a frequency higher than a frequency of said first vibration frequency components in a vibration mode for said normal driving mode.

19. An apparatus according to claim 18, wherein said additional frequency components are insufficient to drive said vibration member so that said vibration member and said contact member move relative to each other.

20. An apparatus according to claim 18, wherein said additional frequency components alone are sufficient to drive said vibration member so that said vibration member and said contact member move relative to each other.

21. An apparatus according to claim 15, wherein said additional frequency components include a variable component.

22. An apparatus according to claim 21, wherein said additional frequency components alone are insufficient to drive said vibration member so that said vibration member and said contact member move relative to each other.

23. An apparatus according to claim 21, wherein said additional frequency components alone are sufficient to drive said vibration member so that said vibration member and said contact member move relative to each other.

24. An apparatus according to claim 15, further comprising:

a drive mechanism rotatably driven by rotation of said contact member.

25. A vibration driven actuator apparatus, comprising:

a vibration member;

a contact member contactable with said vibration member and movable relative to said vibration member by a vibration generated in said vibration member; and a control circuit including means for driving said vibration member in a first vibration mode using first vibration frequency components, in which the vibration member vibrates with a first single order of bending vibration, and driving said vibration member in a second vibration mode using second vibration frequency components, in which the vibration member vibrates with a second single order of bending vibration, said control circuit further including switching circuit means for switching from the first vibration mode in which the vibration member and the contact member move relative to each other, to the second vibration mode in which the vibration member and the contact member move relative to each other.

26. An apparatus according to claim 25, wherein the control circuit switches from said first vibration mode to said second vibration mode when a relative movement speed between said vibration member and said contact member decreases.

27. An apparatus according to claim 26, wherein the relative movement speed is determined on the basis of an output from a speed detecting means.

28. An apparatus according to claim 27, wherein said speed detecting means includes an encoder for detecting a relative movement between the vibration member and the contact member.

29. An apparatus according to claim 25, wherein said first vibration frequency components are different from said second vibration frequency components, and said first vibration frequency components are higher than said second vibration frequency components.

30. An apparatus according to claim 26, wherein said first vibration frequency components are different from said second vibration frequency components, and said first vibration frequency components are higher than said second vibration frequency components.

31. An apparatus according to claim 25, wherein said second vibration mode contains a plurality of different vibration frequency components.

32. An apparatus according to claim 26, wherein said second vibration mode contains a plurality of different vibration frequency components.

33. An apparatus according to claim 25, further comprising:
  a drive mechanism rotatably driven by rotation of said contact member.

34. A vibration driven actuator apparatus, comprising:
  a vibration member;
  a contact member contactable with said vibration member and movable relative to said vibration member by a vibration generated in said vibration member; and
  a control circuit including means for driving said vibration member at a start-up time in a first vibration mode including standing wave vibrations having a plurality of frequency components superimposed on each other, and then driving said vibration member in a second vibration mode different from the first vibration mode.

35. An apparatus according to claim 34, wherein said standing wave vibrations are formed by applying alternating signals of a single phase to a plurality of phases of an electrical-mechanical conversion element on said vibration member.

36. An apparatus according to claim 34, wherein said control circuit drives said vibration member in said first vibration mode at a start-up time, and drives said vibration member in said second vibration mode after a lapse of a predetermined time.

37. An apparatus according to claim 34, further comprising:
  a drive mechanism rotatably driven by rotation of said contact member.

38. A vibration driven actuator apparatus, comprising:
  a vibration member;
  a contact member which is brought into contact with said vibration member; and
  a control circuit for driving said vibration member to vibrate so that said contact member moves relative to said vibration member, said control circuit first driving said vibration member in a first vibration mode in which the vibration member vibrates with one order of bending vibration at a start-up time, then driving said vibration member in a second vibration mode in which the vibration member vibrates with another order of bending vibration different from said one order of bending vibration and in which the vibration member and the contact member are moved relative to each other, and then driving said vibration member in a third vibration mode in which the vibration member and the contact member are moved relative to each other.

39. An apparatus according to claim 38, wherein said first vibration mode includes standing wave vibrations, and the vibration member and the contact member are not moved relative to each other in said first vibration mode.

40. An apparatus according to claim 38, wherein the vibration member and the contact member are moved relative to each other in said first vibration mode.

41. An apparatus according to claim 38, wherein said first vibration mode has a plurality of different vibration frequency components.

42. An apparatus according to claim 38, wherein said first vibration mode includes a variable frequency component.

43. An apparatus according to claim 38, wherein said second vibration mode includes a variable frequency component that varies when the apparatus is switched from said first vibration mode to said second mode.

44. An apparatus according to claim 40, wherein said first vibration frequency components are different from second vibration frequency components, and said first vibration frequency components are higher than said second vibration frequency components.

45. An apparatus according to claim 38, wherein said control circuit first drives said vibration member in said first vibration mode at a start-up time, then drives said vibration member in said second vibration mode after a first point in time is reached, and then drives said vibration member in said third vibration mode after a second point in time is reached.

46. An apparatus according to claim 38, further comprising:
  detecting means for detecting that said vibration member and said contact member have moved relative to each other.

47. An apparatus according to claim 46, wherein said detecting means includes a mechanical-electrical conversion element, and detects the relative movement between said vibration member and said contact member on the basis of a change in an electrical output from said conversion element.

48. An apparatus according to claim 38, further comprising:
  a drive mechanism rotatably driven by rotation of said contact member.

49. A vibration driven actuator apparatus as recited in claim 1, wherein said one order of bending vibration is greater than said another order of bending vibration.

50. A vibration driven actuator apparatus as recited in claim 15, wherein said one order of bending vibration is greater than said another order of bending vibration.

51. A vibration driven actuator apparatus as recited in claim 25, wherein said one order of bending vibration is greater than said another order of bending vibration.

52. A vibration driven actuator apparatus as recited in claim 38, wherein said one order of bending vibration is greater than said another order of bending vibration.

* * * * *

UNITED STATES PATENT AND TRADEMARK OFFICE
CERTIFICATE OF CORRECTION

PATENT NO. : 6,084,335
DATED : July 4, 2000
INVENTOR(S) : JUN TAMAI

It is certified that error appears in the above-identified patent and that said Letters Patent is hereby corrected as shown below:

Column 2

Line 61, "start" should read --starting--.

Column 5

Line 12, "$m\ddot{x}r+k(x_s-x_r)=0$" should read --$m\ddot{x}_r+k(x_s-x_r)=0$--.

Column 17

Line 54, "FIG.FIG 16(a)," should read --FIG. 16(a),--.

Column 19

Line 19, "mode" (second occurrence) should be deleted.

Signed and Sealed this

Tenth Day of April, 2001

Attest:

NICHOLAS P. GODICI

Attesting Officer    Acting Director of the United States Patent and Trademark Office